United States Patent [19]

Tsuchida et al.

[11] Patent Number: 5,219,211
[45] Date of Patent: Jun. 15, 1993

[54] BRAKING SYSTEM FOR MOTORCYCLE HAVING APPORTIONING CONTROL

[75] Inventors: Tetsuo Tsuchida, Saitama; Yukimasa Nishimoto; Takao Yoshida, both of Tokyo; Kanau Iwashita, Saitama; Yoshiaki Sawano, Saitama; Masaru Sasaguchi, Saitama, all of Japan

[73] Assignee: Honda Giken Kogyo Kabushiki Kaisha, Tokyo, Japan

[21] Appl. No.: 673,209

[22] Filed: Mar. 20, 1991

[30] Foreign Application Priority Data

Mar. 20, 1990 [JP] Japan .................. 2-28483[U]
Feb. 18, 1991 [JP] Japan .................. 3-023580

[51] Int. Cl.⁵ .................. B60T 13/00; B60T 11/20
[52] U.S. Cl. .................. 303/9.64; 303/6.01
[58] Field of Search .................. 303/9.61, 9.64, 9.69, 303/6.01, 113.5

[56] References Cited

U.S. PATENT DOCUMENTS

| | | | |
|---|---|---|---|
| 4,239,294 | 12/1980 | Burgdorf | 303/9.64 |
| 4,274,518 | 6/1981 | Berisch | 303/9.64 |
| 4,465,322 | 8/1984 | Hayashi | 303/9.61 |
| 4,494,800 | 1/1985 | Hayashi | 303/9.64 |
| 4,598,954 | 7/1986 | Hayashi | 303/9.61 |
| 4,923,027 | 5/1990 | Hayashi et al. | 303/9.64 |

FOREIGN PATENT DOCUMENTS

| | | |
|---|---|---|
| 2917526 | 11/1980 | Fed. Rep. of Germany . |
| 3011138 | 10/1981 | Fed. Rep. of Germany ..... 303/9.64 |
| 3729145 | 3/1988 | Fed. Rep. of Germany . |
| 3914051 | 10/1990 | Fed. Rep. of Germany . |
| 2283816 | 4/1976 | France . |
| 0202964 | 11/1984 | Japan ..................... 303/9.69 |
| 2134199 | 8/1984 | United Kingdom . |
| 9006871 | 6/1990 | World Int. Prop. O. ......... 303/9.69 |

Primary Examiner—Matthew C. Graham
Attorney, Agent, or Firm—Lyon & Lyon

[57] ABSTRACT

A primary brake system operated by either one of a hand operated means and a foot operated system is mounted on one of the front and rear wheels, and a secondary brake system operated in response to the operation of the primary brake system is mounted on the other wheel. Consequently, it is possible to provide a braking-force distribution for the front and rear wheels with a predetermined common characteristic, leading to an improved brake feel. A braking-force control is provided for controlling the braking-force distribution to the front and rear wheels in accordance with the operating forces of a first input operated by the hand operated element and a second input operated by the foot operated element, so that an ideal distribution characteristic falls within a region between a first braking-force distribution characteristic for the front and rear wheels by the hand operated element and a second braking-force distribution characteristic for the wheels by the foot operated element, such region being a braking-force distribution characteristic region at a time when the hand and foot operated elements are operated simultaneously.

17 Claims, 26 Drawing Sheets

BRAKING SYSTEM FOR MOTORCYCLE HAVING APPORTIONING CONTROL

BACKGROUND OF THE INVENTION

1. Field of the Invention

The field of the present invention is braking systems for motorcycles, and more particularly, braking systems of a type which is capable of simultaneously braking front and rear wheels by any of hand operation and foot operation.

2. Description of the Prior Art

An interlocking braking system for front and rear wheels of a motorcycle is known in which a master cylinder operated by a foot operated element is connected through oil passages to both of a brake cylinder mounted on the front wheel and a brake cylinder mounted on the real wheel. A master cylinder operated by a hand operated element is connected through an oil passage only to the brake cylinder mounted on the front wheel.

In the above prior art braking system for the motorcycle, however, the foot operated element simultaneously brakes the front and rear wheels, but the hand operated element brakes only the front wheel and hence, when both of the hand and foot operated elements are simultaneously used in combination, the braking force provided by the hand and the braking force provided by the foot operated element are added together, which result in an excessively increased braking force. In addition, where it is arranged that the front and rear wheels can be braked simultaneously by operation of any of the hand and foot operated elements, it is difficult to establish the braking-force distribution characteristic for the front and rear wheels.

SUMMARY OF THE INVENTION

Accordingly, it is an object of the present invention to provide a braking system in which the braking-force distribution characteristic for the front and rear wheels provided when both of the hand and foot operated elements are used in combination is established such that a predetermined common-use characteristic or a characteristic within a predetermined region lower than a value of the sum of a braking characteristic obtained by operation of the hand operated element and a braking characteristic by operation of the foot operated element can be obtained, thereby providing an improved brake feel.

To achieve the above object, a first feature of the present invention resides in a braking system for a motorcycle, which is capable of braking both front and rear wheels by operation of either of a first input means operated by a hand operated element and a second input means operated by a foot operated element, the system comprising a primary brake means mounted on one of the front and rear wheels and operated by either one of the first and second input means, and a secondary brake means mounted on the other of the front and rear wheels and operated in response to the operation of the primary braking means.

In addition, a second feature of the present invention resides in a braking system for a motorcycle which is capable of braking both front and rear wheels by operation of any of a first input means operated by a hand operated element and a second input means operated by a foot operated element, the system comprising a braking-force control means for controlling the distribution of a braking force to the front and rear wheels in accordance with respective operating forces of the first and second input means, so that an ideal distribution characteristic falls within a region located between a first braking-force distribution characteristic for the front and rear wheels obtained by the hand operated element alone and a second braking-force distribution characteristic for the front and rear wheels obtained by the foot operated element alone, such region being determined as a braking-force distribution characteristic region at a time when the hand and foot operated elements are both operated.

In addition to the first feature, a third feature is that the braking-force distribution characteristic for the front and rear wheels obtained by the hand operated element approximates a first ideal distribution characteristic provided during application of a low load to a vehicle, and the second braking-force distribution characteristic for the front and rear wheels obtained by the foot operated element approximates a second ideal distribution characteristic provided during application of a higher load than that with first ideal distribution characteristic, so that a region located between the first and second braking-force distribution characteristics is a braking-force distribution characteristic region at a time when the hand and foot operated elements are both operated.

In addition to the first feature, a fourth feature of the present invention resides in the system further including a high select means for selecting the larger one of the braking force of the primary brake means by the hand operated element and the braking force by the foot operated element to transmit the selected braking force to the other wheel.

In addition to the first feature, a fifth feature of the present invention resides in that the system further including a responsive operating means disposed longitudinally along a front fork for operating the secondary brake means in response to the operation of the primary brake means.

In addition to the first feature, a sixth feature of the present invention resides in the secondary brake means including a braking-force control means.

In addition to the sixth feature, a seventh feature of the present invention resides in the braking-force control means having a function to add a force equal to or more than a predetermined pressure to the braking force for the rear wheel when such a force equal to or more than the predetermined pressure is received therein through the second input means.

In addition to the second and seventh features, an eighth feature of the present invention is that the braking-force distribution characteristic of the braking means for the front and rear wheels is established to be of at least three stage steps by a proportional valve, a cut valve and a pressure reduction piston.

In addition to the eighth, a ninth feature of the present invention is that the braking-force control means for producing a braking-force distribution characteristic for the front and rear wheels is disposed in the vicinity of a pivot for a rear fork.

According to the above first and sixth features of the present invention, if the primary brake means mounted on one of the front and rear wheels is operated by the input means operated by operation of the hand operated element or the foot operated element, the other of the front and rear wheels is also braked simultaneously by the secondary brake means operated in response to the operation of the primary brake means. Therefore, for the distribution of the braking force of the front and rear wheels, which is provided by the hand operated element or the foot operated element, the common characteristic can be produced if the same input is provided by either of the operated elements. This leads to an improved brake feel.

According to the second, seventh and eighth features of the present invention, when the hand and foot operated elements are simultaneously operated in combination, since the ideal distribution characteristic falls within the region located between the respective different braking-force distribution characteristics, a braking characteristic close to the ideal distribution characteristic can be easily provided by operation by both the hand and the foot, leading to an improved brake feel.

According to the third feature, the first braking-force distribution characteristic approximating the first ideal distribution characteristic during application of a lower load is provided by the operation of the hand operated element, while the second braking-force distribution characteristic approximating the second ideal distribution characteristic during application of a higher load is provided by the operation of the foot operated element and therefore, even when the hand and foot operated elements are used simultaneously, the braking-force distribution characteristic can easily fall in the region surrounded by the first and second braking-force distribution characteristics, thereby permitting the provision of a braking characteristic close to the ideal distribution characteristic without detection of a load applied to the vehicle, leading to an improved brake feel.

According to the fourth feature of the present invention, the larger one of the braking force provided for the front wheel by the hand operated element and the braking force provided for the front wheel by the foot operated element is selected and transmitted to the rear wheel and therefore, even if an input is provided to either of the hand and foot operated elements, it is possible to maintain the braking-force distribution ratio appropriately in accordance with a higher one of the inputs.

According to the fifth feature of the present invention, the responsively operating means for operating the secondary brake means in response to the operation of the primary brake means is disposed to extend longitudinally of the front fork and therefore, the obstruction of the position of disposition of the primary brake means by the responsively operating means is eliminated to provide an improved detaching property of the primary brake means.

According to the ninth feature of the present invention, the braking-force control means for producing the braking-force distribution characteristic for the front and rear wheels is disposed in the vicinity of the pivot of the rear fork and therefore, the distance between the braking-force control means and the brake means on the rear wheel is shortened, resulting in an increased rigidity of the piping and moreover in a facilitated protection of the braking-force control means.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 9 illustrate a first embodiment of the present invention, wherein

FIG. 1 is a general plan view of a motorcycle equipped with a braking system of the first embodiment;

FIG. 2 is an illustration of the entire construction of the braking system;

FIG. 3 is an enlarged view of a portion indicated by numeral 3 in FIG. 2;

FIG. 4 is an enlarged-view of an essential portion shown in FIG. 3;

FIG. 5 is an enlarged view of a portion indicated by numeral 5 in FIG. 2;

FIG. 6 is an enlarged view of a portion indicated by numeral 6 in FIG. 2;

FIG. 7 is an enlarged side view of a rear fork portion of the motorcycle;

FIG. 8 is a view taken along an arrow 8 in FIG. 7; and

FIG. 9 is a graph illustrating a braking characteristic of the first embodiment;

FIGS. 10 to 20 illustrate a second embodiment of the present invention, wherein

FIG. 10 is a general plan view of a motorcycle equipped with a braking system of the second embodiment;

FIG. 11 is an illustration of the entire construction of the braking system;

FIG. 12 is an enlarged view of a portion indicated by numeral 12 in FIG. 11;

FIG. 13 is a sectional view taken along a line 13—13 in FIG. 12;

FIG. 14 is a sectional view taken along a line 14—14 in FIG. 12;

FIG. 15 is an enlarged view of a portion indicated by numeral 15 in FIG. 11;

FIG. 16 is an enlarged view of a portion indicated by numeral 16 in FIG. 11;

FIG. 17 is a sectional view taken along a line 17—17 in FIG. 12;

FIG. 18 is a graph illustrating a characteristic of a proportioning pressure reduction valve;

FIG. 19 is a block diagram for explaining the operation; and

FIG. 20 is a graph illustrating a braking characteristic of the second embodiment;

FIGS. 21 to 23 illustrate a third embodiment of the present invention, wherein

FIG. 21 is a general plan view of a motorcycle equipped with a braking system of the third embodiment;

FIG. 22 is an enlarged view of a portion indicated by numeral 22 in FIG. 21; and FIG. 23 is a view for explaining the operation;

DESCRIPTION OF THE PREFERRED EMBODIMENTS

A first embodiment of the present invention will now be described in connection with the accompanying drawings.

Figure 1:
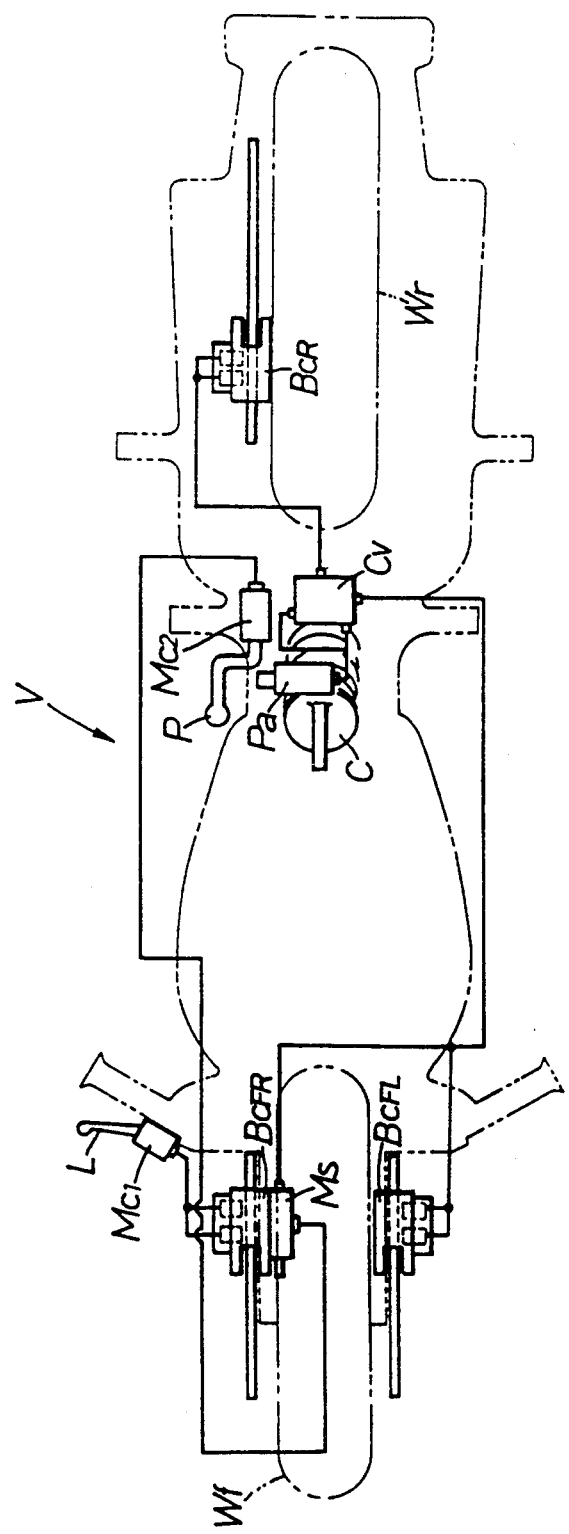
Figure 2:
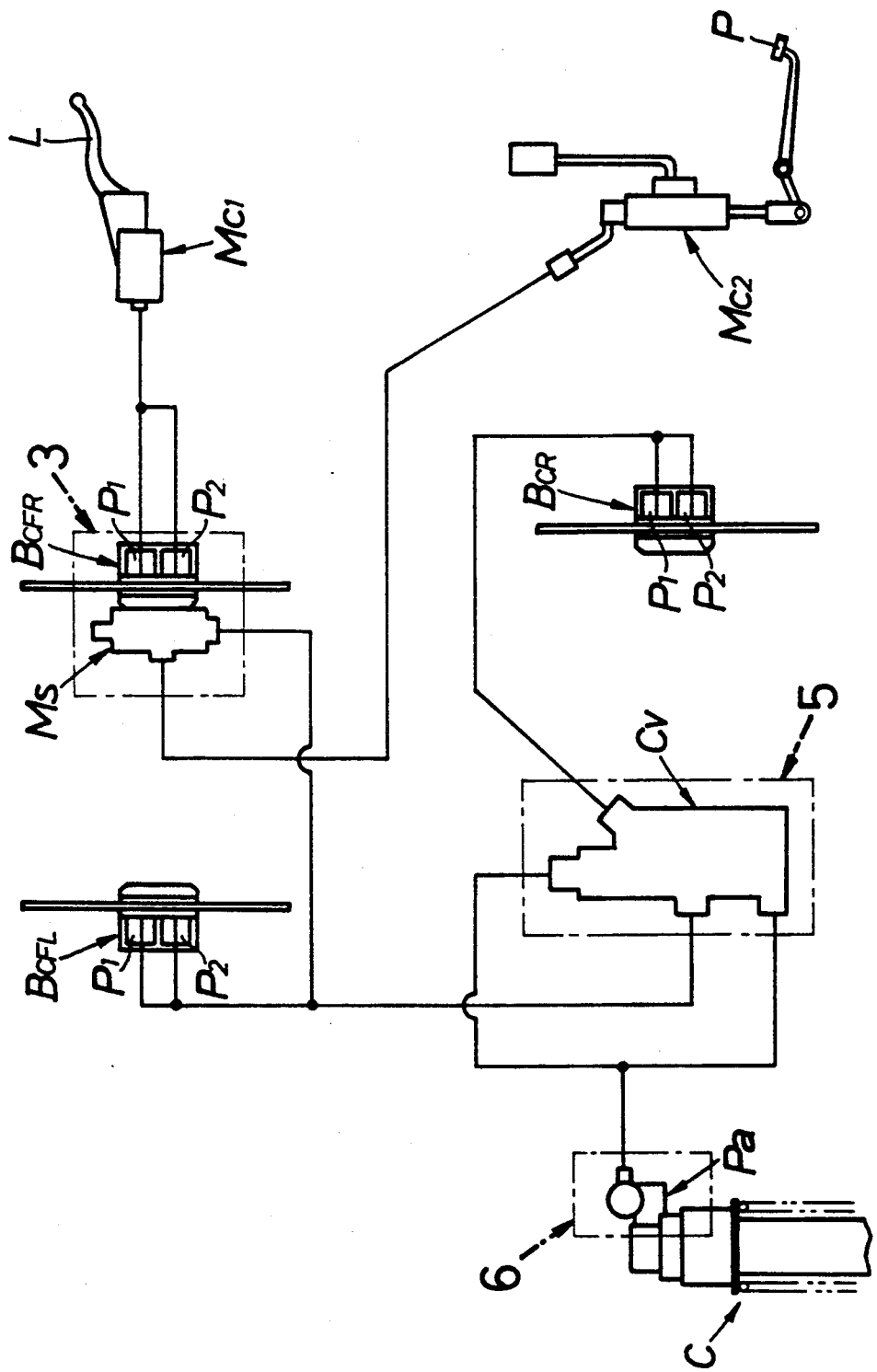

Referring to FIGS. 1 and 2, a motorcycle V includes a brake lever L as a hand operated element mounted on a handlebar, and a brake pedal P as a foot operated element mounted on a vehicle body frame. Left and right brake cylinders $Bc_{FL}$ and $Bc_{FR}$ are mounted on a front wheel Wf and each includes two pots, i.e., a front pot $P_1$ and a rear pot $P_2$. A first master cylinder $Mc_1$ operated by the brake lever L is connected directly to the two pots $P_1$ and $P_2$ in the right brake cylinder $Bc_{FR}$. A mechanical servo mechanism Ms is mounted on the right brake cylinder $Bc_{FR}$ of the front wheel Wf for generating a hydraulic braking pressure by utilizing a braking force for the front wheel Wf, the hydraulic braking pressure generated by the mechanical servo mechanism Ms is transmitted to the two pots $P_1$ and $P_2$ in the left brake cylinder $Bc_{FL}$ of the front wheel Wf and also to two pots $P_1$ and $P_2$ in a rear brake cylinder $Bc_R$ of a rear wheel Wr through a pressure control valve Cv. A second master cylinder $Mc_2$ operated by the brake pedal P is connected to the mechanical servo mechanism Ms. A pre-load adjuster Pa mounted on a rear cushion C is connected to the pressure control valve Cv to modify the braking characteristic according to the number of occupants.

Figure 3:
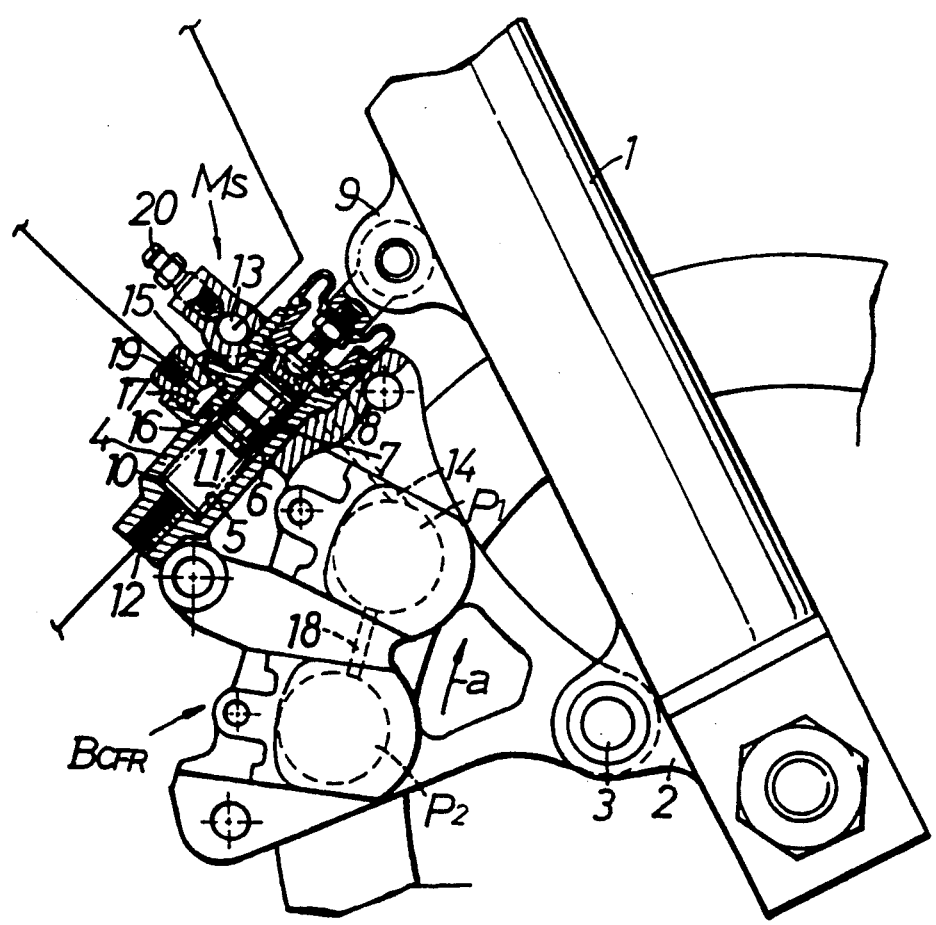
Figure 4:
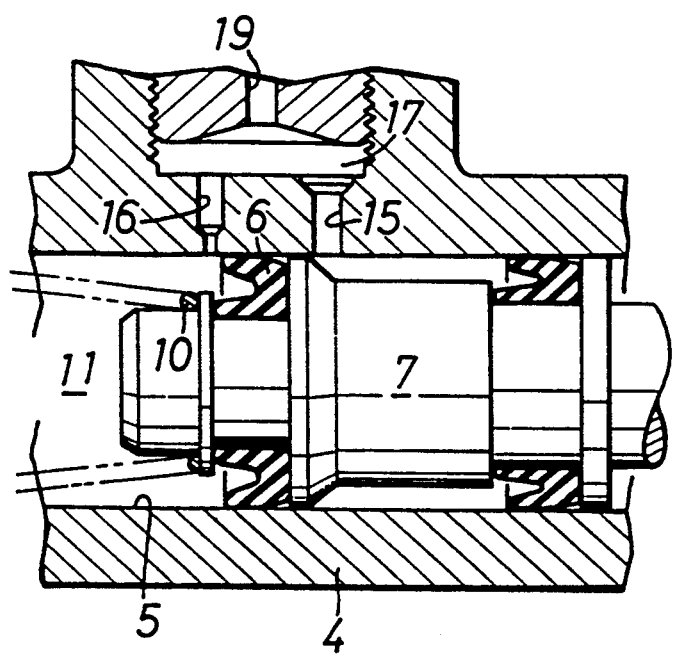

Referring to FIGS. 3 and 4, the mechanical servo mechanism Ms is integrally provided at an outer end of the right brake cylinder $Bc_{FR}$. The cylinder $Bc_{FR}$ is pivotally supported by a pin 3 on a bracket 2 which is fixedly mounted on a front fork 1 of the front wheel Wf. A piston 7 is provided with a primary cup 6 having a lip around its outer periphery and is slidably received in a cylinder portion 5 defined in a casing 4 of the mechanical servo mechanism Ms. The piston 7 is connected through a rod 8 to a bracket 9 which is fixedly mounted on the front fork 1. An oil chamber 11 is defined between the piston 7 and the cylinder portion 5 and has a return spring 10 contained therein. An output port 12 is provided in the oil chamber 11 and connected to the left brake cylinder $Bc_{FL}$ of the front wheel Wf and the pressure control valve Cv. An input port 13 is provided in the casing 4 and connected to the first master cylinder $Mc_1$. The input port 13 communicates with the front pot $P_1$ of the right brake cylinder $Bc_{FR}$ through an oil passage 14 and further with the rear pot $P_2$ through an oil passage 18. An auxiliary oil chamber 17 is defined in the casing 4 to communicate with the oil chamber 11 through a secondary port 15 and a primary port 16 and is connected to the second master cylinder $Mc_2$ through an input port 19. Reference character 20 designates an air-venting plug for exhausting air during filling of braking oil.

Figure 5:
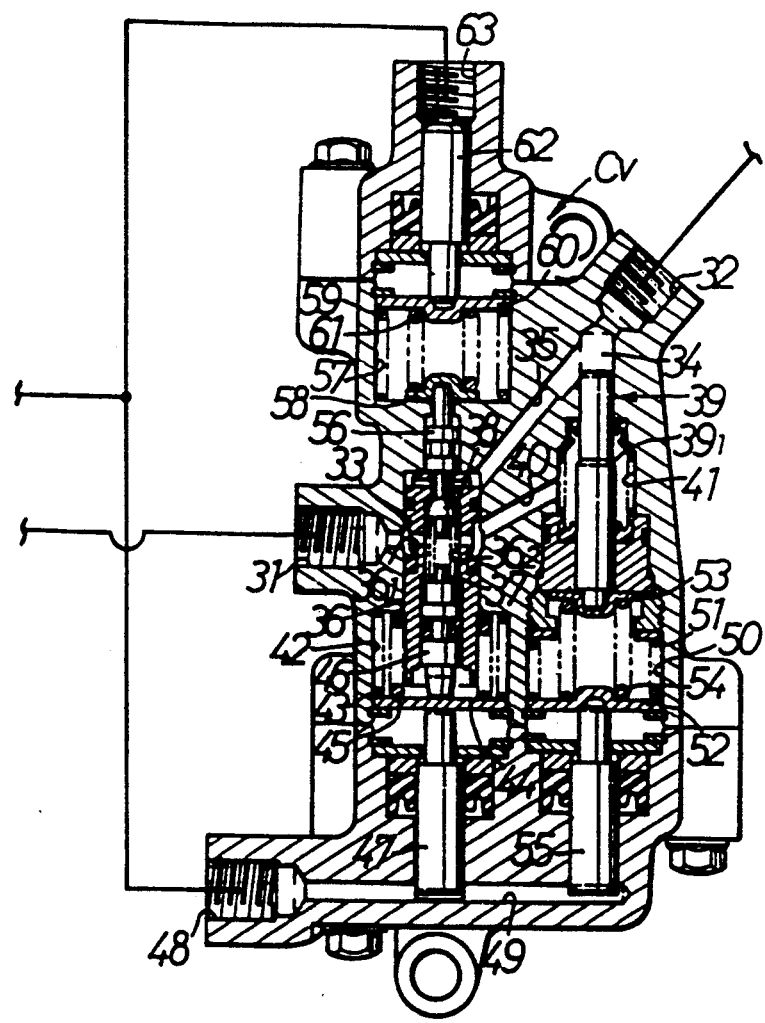

The structure of the pressure control valve Cv will now be described in connection with FIG. 5. The pressure control valve Cv includes an input port 31 connected to the output port 12 of the mechanical servo mechanism Ms, and an output port 32 connected to the pots $P_1$ and $P_2$ of the brake cylinder $BC_R$ of the rear wheel Wr. As shown in FIG. 5, a valve chest 33 communicating with the input port 31 and an oil chamber 34 communicating with the output port 32 are interconnected through an oil passage 35, and a proportional valve 36 is vertically movably disposed within the valve chest 33. A cut valve 38 is disposed in an internal chamber $36_2$ of the proportional valve 36 and biased in a closing direction by a valve spring 37, the internal chamber $36_2$ communicating with the input port 31 through an oil hole $36_1$. When the cut valve 38 is in an opened position shown in FIG. 5, the input port 31 communicates with the output port 32 through the oil hole $36_1$, the internal chamber $36_2$, a periphery of the cut valve 38, the oil passage 35 and the oil chamber 34. The pressure control valve Cv further includes a pressure reduction piston 39 which faces at one of opposite ends the oil chamber 34, and which has a step $39_1$ formed at its intermediate portion and disposed in a valve chest 41 communicating with the valve chest 33 via an oil passage 40.

A spring seat 44 is provided within a spring chamber 42 connected to a lower portion of the valve chest 33 and is biased downwardly by a return spring 43, and a valve spring 45 is provided in a compressed manner between the spring seat 44 and the proportional valve 36. An auxiliary valve 46 is slidably received in the internal chamber $36_2$ of the proportional valve 36 and has its lower end abutting against the spring seat 44 and at its upper end supports the valve spring 37 for biasing the cut valve 38. A load sensing valve 47 is vertically movably supported below the spring chamber 42 and has its upper end abutting against a lower surface of the spring seat 44 and its lower end projecting into an oil chamber 49 which communicates through an input port 48 with the pre-load adjuster Pa which will be described in detail hereinafter. A spring chamber 50 is defined below the pressure reduction piston 39, and has a spring seat 52 provided therein and biased downwardly by a return spring 51, and a valve spring 54 is provided in a compressed manner between the spring seat 52 and a spring seat 53 supporting a lower end of the pressure reduction piston 39. A load sensing valve 55 which is vertically movably supported below the spring chamber 50 abuts at an upper end thereof against the spring seat 52, and a lower end of the valve 55 projects into the oil chamber 49. An auxiliary valve member 56 is vertically movably disposed in an upper portion of the valve chest 33 and is capable of abutting against the upper end of the cut valve 38 to forcibly open the cut valve 38. An upper end of the auxiliary valve member 56 abuts against a spring seat 58 disposed in the spring chamber 57, and a valve spring 61 is provided in a compressed manner between the spring seat 58 and a spring seat 60 which is biased upwardly by a return spring 59. A load sensing valve 62 is vertically movably supported above the spring chamber 57 and abuts at its lower end against an upper surface of the spring seat 60 and projects at its upper end into an input port 63 which communicates with the pre-load adjuster Pa.

Figure 6:
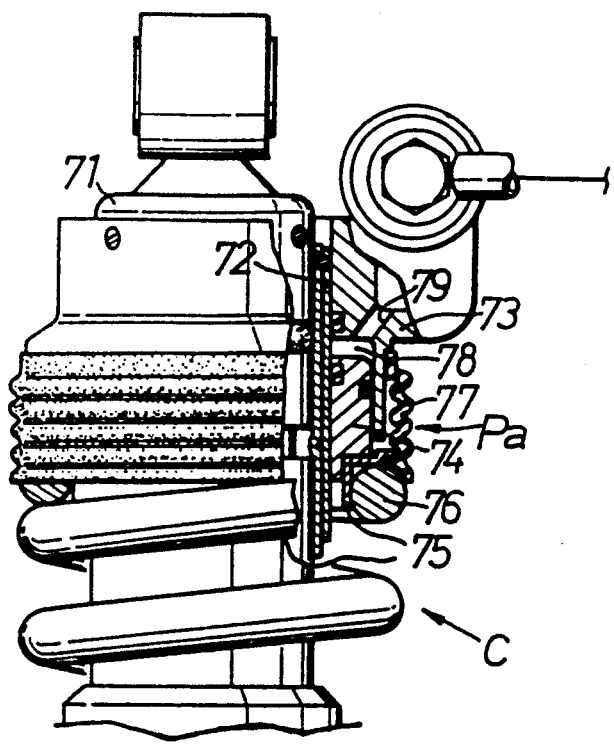

As shown in FIG. 6, the pre-load adjuster Pa mounted on the rear cushion C comprises an annular piston 74 slidably received for up and down movement in an annular space which is defined between a cylindrical member 72 secured to an upper, outer periphery of an oil damper 71 and a cylinder member 73 having a lower surface opened. A buffer spring 76 of the rear cushion C is supported at its upper end on a retainer 75 mounted on a lower portion of the annular piston 74, and a boot 77 made of resilient material is mounted between the retainer 75 and the cylinder member 73. An oil chamber 78 is defined by the cylindrical member 72, the cylinder member 73 and the annular piston 74 and is connected to input ports 48 and 63 of the pressure control valve Cv through an output port 79.

Figure 7:
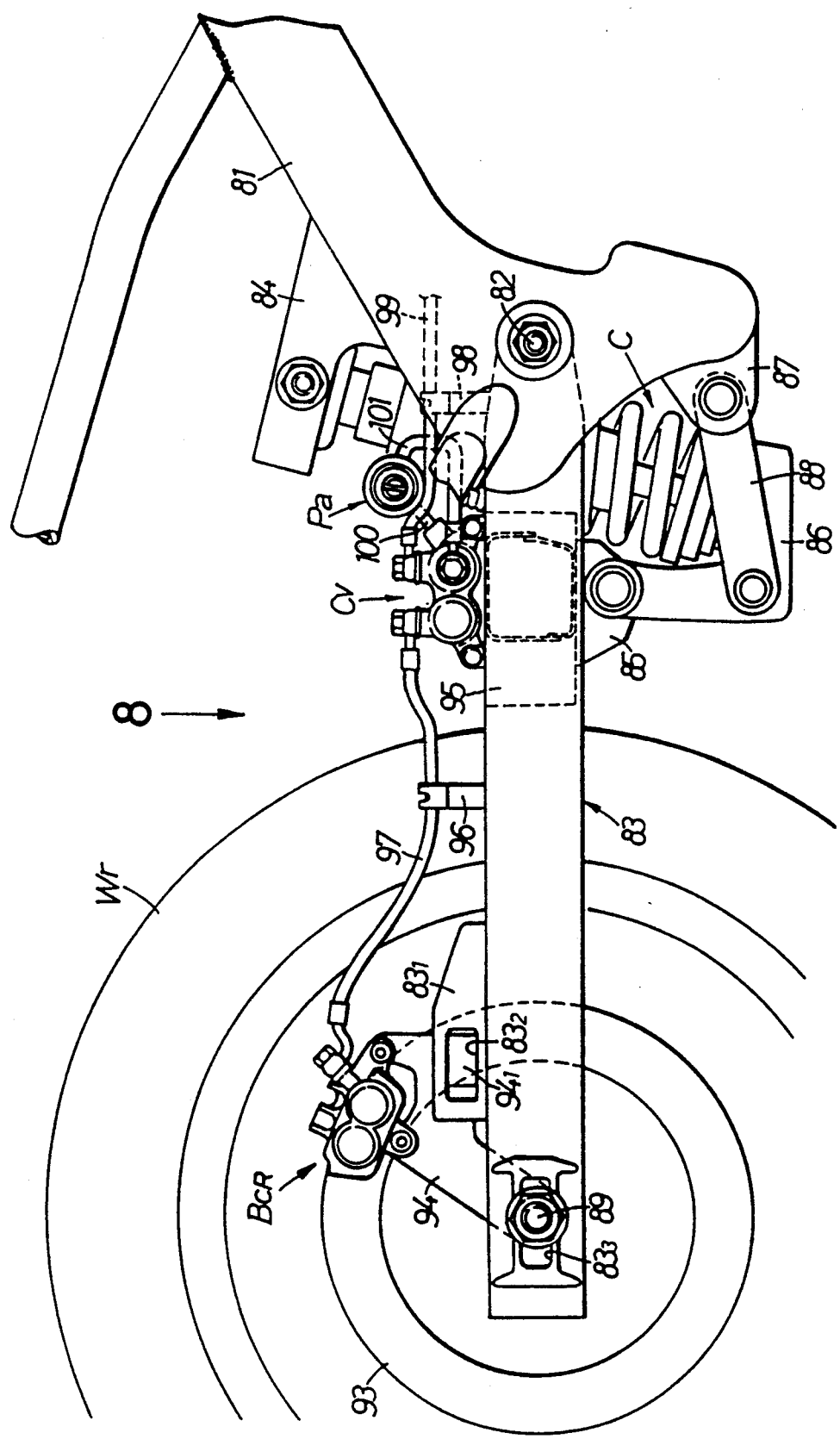
Figure 8:
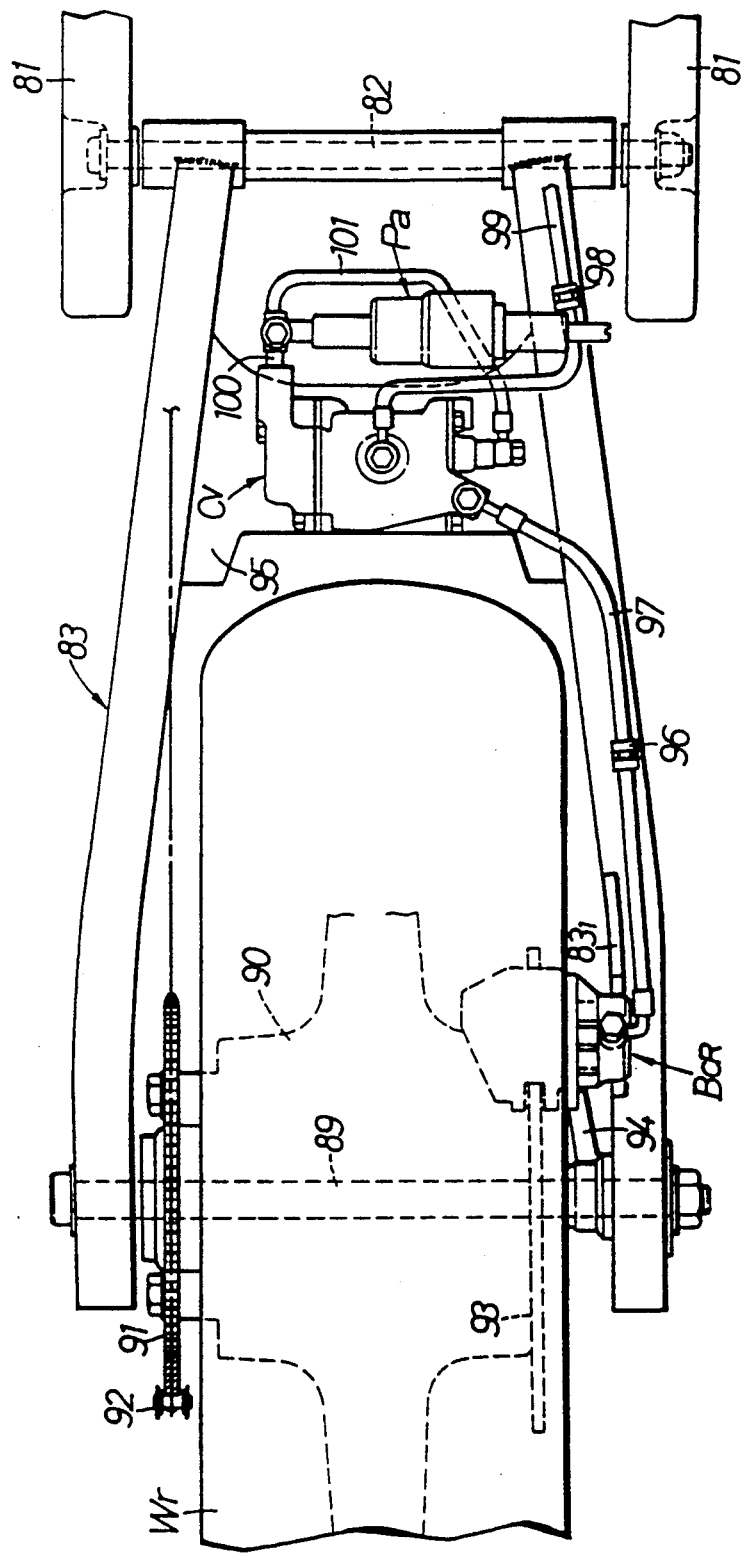

As shown in FIGS. 7 and 8, a front end of a rear fork 83 is vertically pivotally supported to a rear portion of a vehicle body frame 81 of the motorcycle V through a pivot 82. The upper and lower ends of the rear cushion C are connected to a bracket 84 mounted on an upper surface of the vehicle body frame 81 and to a first L-shaped link 86, respectively. The link 86 is pivotally supported at one end of a bracket 85 mounted on a lower surface of the rear fork 83. Further, a bracket 87 mounted on a lower surface of the vehicle body frame 81 is connected with the first link 86 by a second rectilinear link 88. Thus, when the rear fork 83 is vertically swung about the pivot 82, a load produced thereby is buffered by the expansion and contraction of the rear cushion C.

An axle 89 is fixed in elongated holes $83_3$ made in a rear end portion of the bifurcated rear fork 83, so that the position of the axle 89 in the longitudinal direction of the motorcycle can be adjusted. A driving chain 92 is wound around a sprocket 91 which is secured to a left side of a hub 90 of the rear wheel Wr which is supported on the axle 89. A brake disk 93 is secured to a right side of the hub 90 and adapted to be clamped, for braking, by the brake cylinder $Bc_R$ mounted on an upper portion of a brake cylinder supporting member 94 which is mounted on a rear end of the rear fork 83. The brake cylinder supporting member 94 is pivotally supported at its lower end on the axle 89 and has a projection 94, provided at its front end so as to be engaged in an elongated hole $83_2$ formed in a bracket $83_1$ which is mounted on an upper surface of the rear fork 83 to project therefrom, so that when the longitudinal position of the rear wheel Wr is adjusted, the position of the brake cylinder $Bc_R$ relative to the fork 83 may also be adjusted in a longitudinal direction in unison with the rear wheel Wr.

The pressure control valve Cv is mounted on an upper surface of a support plate 95 which is provided to connect left and right front portions of the rear fork 83. The pressure control valve Cv is located between the rear cushion C and the rear wheel Wr as viewed from a lateral side and is further located within a width of the rear fork 83 as viewed from the plane. The pressure control vale Cv and the brake cylinder $Bc_R$ are interconnected through a metallic flare pipe 97 which extends along the upper surface of the rear fork 83 and is fixed thereon by a supporting member 96. In addition, the pressure control valve Cv and the mechanical servo mechanism Ms are interconnected through a flare pipe 99 fixed on the upper surface of the rear fork 83 by a supporting member 98. Further, the pressure control valve Cv and the pre-load adjuster Pa mounted at the upper end of the rear cushion C are interconnected through two rubber pipes 100 and 101. Thus, when the rear fork 83 is swung, relative movement between the pre-load adjuster Pa and the pressure control valve Cv is absorbed by deformation of the rubber pipes 100 and 101.

Description will now be made of the operation of the first embodiment of the present invention having the above-described construction.

If the brake lever L is operated, a hydraulic braking pressure generated by the first master cylinder $Mc_1$ is transmitted to the two pots $P_1$ and $P_2$ of the right brake cylinder $Bc_{FR}$ of the front wheel Wf to brake the front wheel Wf. In this case, as can be seen from FIG. 3, the brake cylinder $Bc_{FR}$ is swung about the pin 3 of the direction of an arrow a and hence, the casing 4 of the mechanical servo mechanism Ms integrally provided on the upper portion of the brake cylinder $Bc_{FR}$ is moved in the same direction, with the result that the piston 7 supported on the front fork 1 through the rod 8 is advanced within the cylinder portion 5 against a force of the return spring 10. Then, the primary cup 6 is immediately passed through the primary port 16 to cut the communication of the primary port 16 with the oil chamber 11. Therefore, a secondary hydraulic braking pressure is developed in the oil chamber 11 in accordance with the amount of advancing movement of the piston 7 and transmitted through the output port 12 to the two pots $P_1$ and $P_2$ of the left brake cylinder $Bc_{FL}$ of the front wheel Wf and at the same time to the two pots $P_1$ and $P_2$ of the brake cylinder $Bc_R$ of the rear wheel Wr and to the pressure control valve Cv.

In addition, if the brake pedal P is operated, a hydraulic braking pressure generated by the second master cylinder $Mc_2$ is transmitted to the input port 19 of the mechanical servo mechanism Ms. Such hydraulic braking pressure is transmitted from the auxiliary oil chamber 17 through the primary oil port 16 to the oil chamber 11 to simultaneously operate both of the left brake cylinder $Bc_{FL}$ of the front wheel Wf and the brake cylinder $Bc_R$ of the rear wheel Wr in the same manner as when the mechanical servo mechanism Ms is operated. If the brake lever L and the brake pedal P have been simultaneously operated, the hydraulic braking pressure produced by the second master cylinder $Mc_2$ is transmitted to both of the left braking cylinder $Bc_{FL}$ of the front wheel Wf and the brake cylinder $Bc_R$ of the rear wheel Wr, but this is only when the hydraulic pressure within the oil chamber 11 in the mechanical servo mechanism Ms is smaller than the hydraulic pressure transmitted from the second master cylinder $Mc_2$ to the auxiliary oil chamber 17 in the mechanical servo mechanism Ms. Specifically, only when the hydraulic pressure transmitted to the auxiliary oil chamber 17 is increased in excess of the hydraulic pressure prevailing within the oil chamber 11, such hydraulic pressure fed to the auxiliary oil chamber can be transmitted through the secondary port 15 to a back of the primary cup to urge and flex the lip of the primary cup 6 and further transmitted to the oil chamber 11. Therefore, when the secondary hydraulic braking pressure produced by the mechanical servo mechanism Ms is larger than the hydraulic braking pressure produced by the second master cylinder $Mc_2$, the hydraulic braking pressure from the mechanical servo mechanism Ms is transmitted to both of the left braking cylinder $Bc_{FL}$ of the front wheel Wf and the braking cylinder $Bc_R$ of the rear wheel Wr. Conversely, when the hydraulic braking pressure produced by the mechanical servomechanism Ms is less than that produced by the second master cylinder $Mc_2$, such hydraulic braking pressure from the second master cylinder $Mc_2$ is transmitted to both of the left braking cylinder $Bc_{FL}$ of the front wheel Wf and the braking cylinder $Bc_R$ of the rear wheel Wr.

When the hydraulic braking pressure from the mechanical servo mechanism Ms is applied to the input port 31 in the pressure control valve Cv in this manner by the operation of the brake lever L and/or the brake pedal P, the pressure is transmitted to the brake cylinder $BC_R$ via the oil hole $36_1$ and the internal chamber $36_2$ in the proportional valve 36, the outer periphery of the cut valve 38, the oil passage 35, the oil chamber 34 and the output port 32. During this time, both of the braking forces for the front and rear wheels Wf and Wr are increased in accordance with the amount of operation of the brake lever L and/or the brake pedal P, and hence, the characteristic of distribution of such braking forces can be represented by a line connecting a point O and a point A in FIG. 9.

Figure 9:
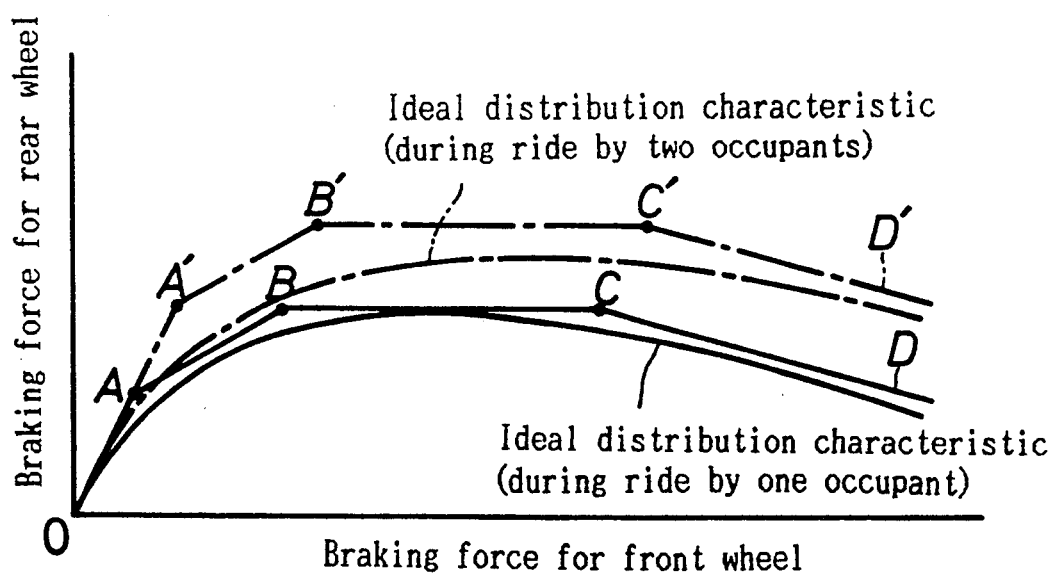

If the hydraulic braking pressure transmitted to the input port 31 in the pressure control valve Cv is gradually increased so that the braking force for the rear wheel Wr reaches the point A in FIG. 9, the proportional valve 36 is moved downwards in FIG. 5 against a preset load of the valve spring 45 by the hydraulic braking pressure acting on the upper surface of the proportional valve 36. As a result, the proportional valve 36 is brought into close contact with the cut valve 38, so that the communication of the input port 31 with the output port 32 is temporarily cut off, but if the hydraulic braking pressure transmitted to the input port 31 is further increased, the pressure in the internal chamber $36_2$ in the proportional valve 36 is increased, thereby causing the proportional valve 36 to be pushed upwards, so that the input and output ports 31 and 32 are again put into communication with each other. The vertical vibratory or reciprocal movement of the proportional valve 36 generated with an increase in the hydraulic braking pressure in this manner causes the clearance between the proportional valve 36 and the cut valve 3 to be intermittently opened and closed and therefore, the rate of increase in the hydraulic braking pressure transmitted to the brake cylinder $Bc_R$ is reduced. Consequently, the increase rate of the braking force for the rear wheel Wr is decreased from the point A as a boundary point in FIG. 9.

If the hydraulic braking pressure transmitted to the input port 31 in the pressure control valve Cv is further increased so that the braking force for the rear wheel Wr reaches a point B in FIG. 9, the auxiliary valve member 56 is raised against a preset load of the valve spring 61. The cut valve 38 biased by the valve spring 37 is raised thereby into close contact with the proportional valve 36. This causes the communication between the input and output ports 31 and 32 to be cut off and hence, even if the hydraulic braking pressure transmitted to the input port 31 is thereafter increased, the hydraulic braking pressure transmitted from the output port 32 to the brake cylinder $Bc_R$ is kept constant.

If the hydraulic braking pressure transmitted to the input port 31 in the pressure control valve Cv is further increased and the braking force for the rear wheel Wr reaches a point C in FIG. 9, such hydraulic braking pressure is transmitted through the oil passage 40 to the oil chamber 41 thereby to lower the pressure reduction piston 39 against a preset load of the valve spring 54. As a result, the upper end of the reduction piston 39 is lowered to increase the volume of the oil chamber 34, so that the hydraulic braking pressure in the brake cylinder $Bc_R$ is reduced.

Thus, the hydraulic braking pressure transmitted to the brake cylinder $Bc_R$ of the rear wheel Wr by the action of the pressure control valve Cv, i.e., the braking force for the rear wheel Wr varies at four stages, and the ratio of distribution of the braking forces to the front and rear wheels Wf and Wr varies as shown by a line O-A-B-C-D in FIG. 9. This ensures that a sharing characteristic extremely near an ideal distribution characteristic can be obtained.

Now, if an increased load is applied to the rear cushion C as a result of two occupants riding on the motorcycle V, the annular piston 74 supporting the upper end of the buffer spring 76 through the retainer 75 is subjected to an upward load, so that a hydraulic pressure developed in the oil chamber 78 is increased. Such hydraulic pressure produced by the pre-load adjuster Pa is transmitted to the oil chamber 49 via the output port 79 and the input port 48 to urge the two load sensing valves 47 and 55 upwardly. As a result, the set loads of the valve spring 45 for biasing the proportional valve 36 and the valve spring 54 for biasing the pressure reduction piston 39 are increased. Likewise, the hydraulic pressure produced by the pre-load adjuster Pa is transmitted to the input port 63 thereby to urge the load sensing valve 62 downwardly, so that the valve spring 61 for biasing the auxiliary valve member 56 is increased.

If the set loads of the valve springs 42, 53 and 61 for biasing the proportional valve 36, the cut valve 38 and the pressure reduction piston 39 are increased in the above manner upon ride by two persons, the time points when the two valves 36 and 38 and the reduction piston 39 are operated, i.e., the positions of the points A to C in FIG. 9 are displaced. This ensures that the characteristic of distribution of the braking forces to the front and rear wheels Wf and Wr varies as shown by a dashed line passing point A' to point D' and the ratio of the braking force of the rear wheel Wr with respect to the braking force of the front wheel Wf can be increased so as to approximate an ideal distribution characteristic during ride by two persons.

In the above manner, when the brake lever L is operated, the right braking cylinder $Bc_{FR}$ of the front wheel Wf is operated by the hydraulic braking pressure produced by the first master cylinder $Mc_1$, and the left brake cylinder $Bc_{FL}$ of the front wheel Wf and the brake cylinder $Bc_R$ of the rear wheel Wr are operated by the secondary hydraulic braking pressure generated by the mechanical servo mechanism Ms operated by such braking force. Therefore, the oil path for transmitting the hydraulic braking pressure can be shortened to insure a moderate feeling rigidity to the braking operation. Moreover, the oil path for the hydraulic braking pressure produced by the first master cylinder $Mc_1$ as a result of the operation of the brake lever L and the oil path for the hydraulic braking pressure produced by the second master cylinder $Mc_2$ as a result of the operation of the brake pedal P are independent from each other and therefore, even if the brake pedal P is strongly operated, it is possible to avoid a kick-back to the brake lever L.

A second embodiment of the present invention will now be described in connection with FIGS. 10 to 20.

Figure 10:
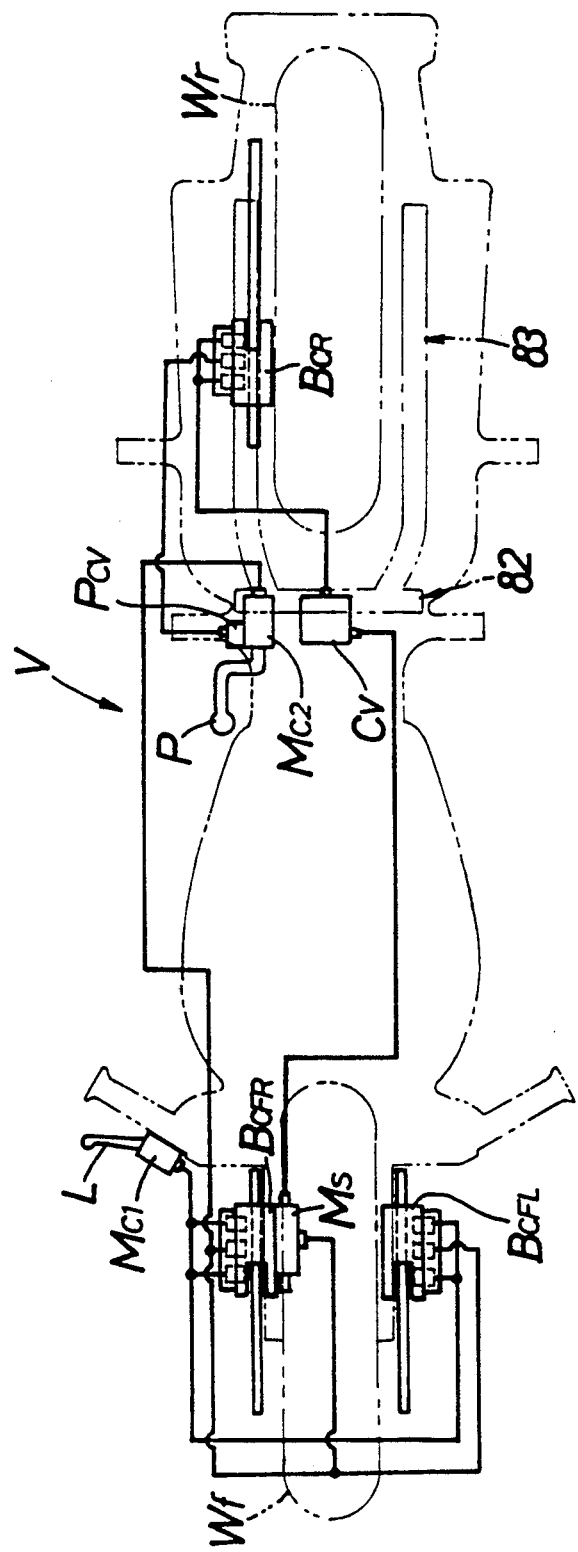
Figure 11:
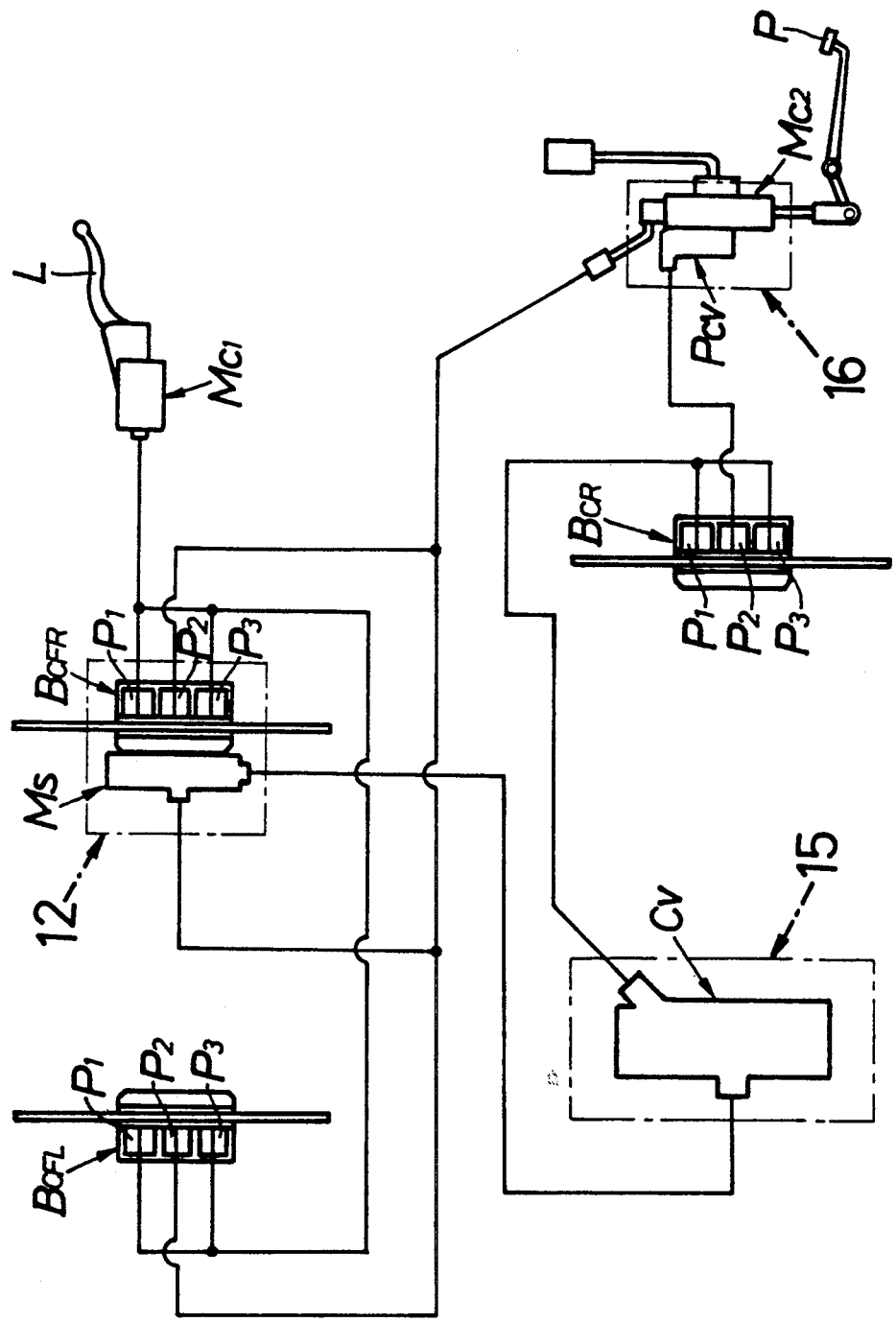

Referring to FIGS. 10 and 11, a first master cylinder $Mc_1$ operated by a brake lever L as a hand operated element mounted on handlebar is connected directly to front pots $P_1$ and rear pots $P_3$ of the left and right brake cylinders $Bc_{FL}$ and $Bc_{FR}$ of the front wheel Wf each having three pots $P_1$, $P_2$, and $P_3$. On the other hand, a second master cylinder $Mc_2$ operated by a brake pedal P as a foot operated element is connected directly to central pots $P_2$ of the left and right brake cylinders $Bc_{FL}$ and $Bc_{FR}$ of the front wheel Wf. A mechanical servo mechanism Ms is mounted on the right brake cylinder $Bc_{FR}$ of the front wheel Wf. A hydraulic braking pressure produced by the mechanical servo mechanism Ms is supplied through a pressure control valve Cv to front and rear pots $P_1$ and $P_3$ of a brake cylinder $Bc_R$ of the rear wheel Wr having three pots $P_1$, $P_2$ and $P_3$. The second master cylinder $Mc_2$ is also connected to the mechanical servo mechanism Ms, and a proportional pressure reduction valve Pcv is integrally provided in the second master cylinder $Mc_2$ and is connected to the central pot $P_2$ of the brake cylinder $Bc_R$ of the rear wheel Wr.

Figure 12:
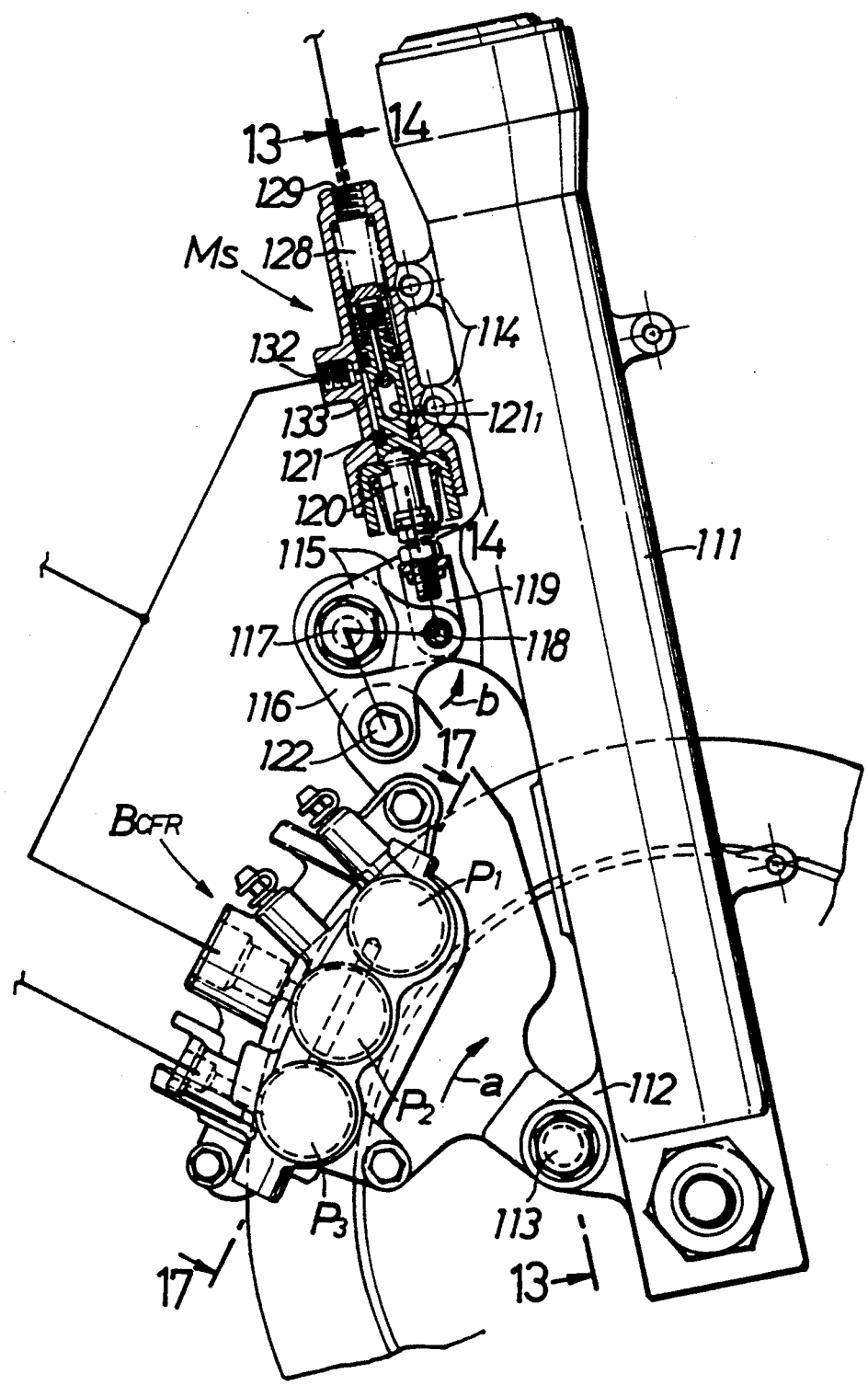
Figure 13:
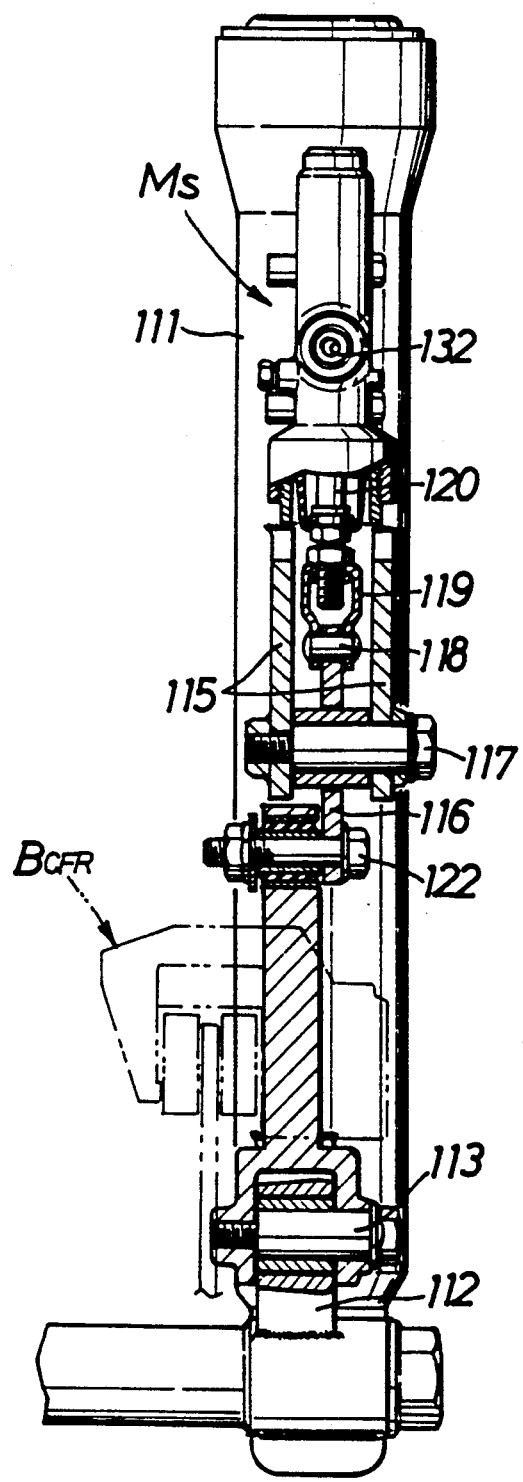

As shown in FIGS. 12 and 13, the right brake cylinder $Bc_{FR}$ of the front wheel Wf is pivotally mounted by a pin 113 on a bracket 112 which is fixedly mounted on a lower portion of a front fork 111. The substantially cylindrical mechanical servo mechanism Ms is supported on an upper portion of the front fork 111 in a vertical position along a back surface thereof through a pair of brackets 114. An L-shaped link 116 is pivotally mounted by a pin 117 on a bracket 115 which is fixedly mounted on the front fork 111. An upper end of a rod 120 which is integral with a connecting member 119 pivotally mounted on one end of the link 116 by a pin 118 abuts against a lower end of a piston 121 of the mechanical servo mechanism Ms. The other end of the link 116 is pivoted to an upper end of the right brake cylinder $Bc_{FR}$ through a pin 122. Thus, if the brake cylinder $Bc_{FR}$ is swung in a direction of an arrow a by braking the front wheel Wf, the link 116 is swung in a direction of an arrow b to urge the rod 120 upwardly, thereby causing the mechanical servo mechanism Ms to produce a secondary hydraulic braking pressure.

Figure 14:
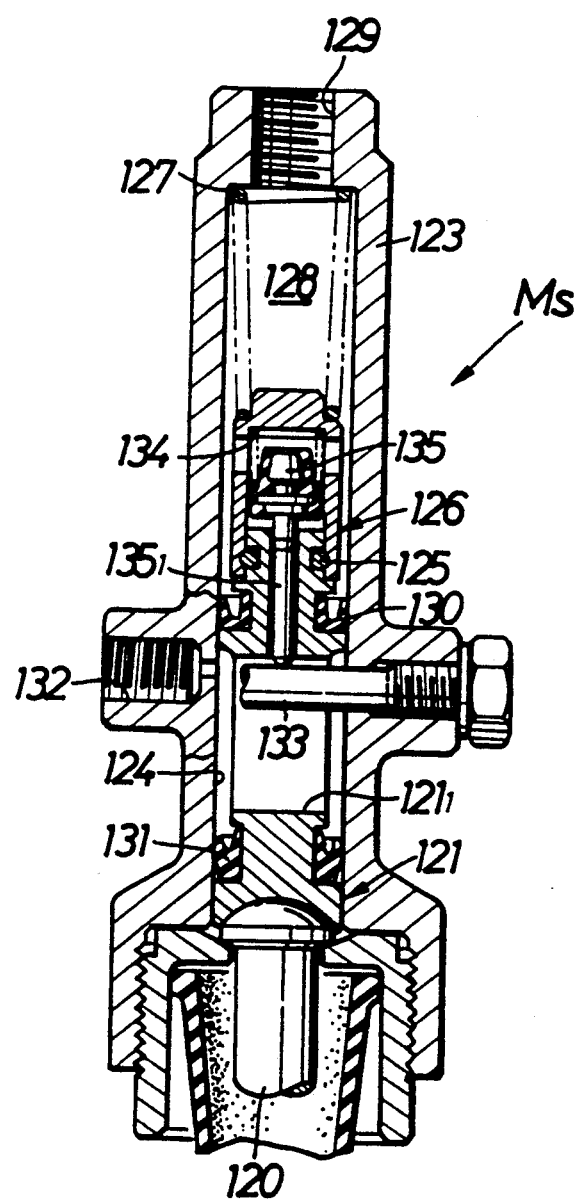

As can be seen from FIG. 14, a cylinder portion 124 is formed in a casing 123 of the mechanical servo mechanism Ms, and a valve guide 126 is coupled through an O-ring 125 to an upper end of the piston 121 which is slidably received in the cylinder portion 124. An oil chamber 128 is defined at an upper portion of the cylinder portion 124 and contains a return spring 127 for biasing the valve guide 126 and the piston 121 downwardly. An output port 129 is provided at an upper end of the oil chamber 128.

A primary cup 130 and a secondary cup 131 are mounted on front and rear ends, or upper and lower ends of the piston 121, respectively, and the casing 123 is provided with a secondary port 132 located between the cups 130 and 131 and connected to the second master cylinder $Mc_2$. An intermediate portion of the piston $121_1$ is provided with an elongated groove $121_1$ extending radially therethrough, and a stopper bolt 133 threadably mounted in the casing 12 is slidably and loosely fitted into the elongated groove $121_1$.

A valve 135 is contained in a loosely fitted manner within the valve guide 126 and is biased by a valve spring 134 so as to abut against a top surface of the piston 121 and assume a closed position. A leg $135_1$ is integrally formed on the valve 135 so as to extend through a central portion of the upper portion of the piston 121 into the elongated groove $121_1$ and to abut against the stopper bolt 133. Thus, when the piston 121 is retracted to a position shown in FIG. 14 by a repulsive force of the return spring 127, the leg $135_1$ of the valve 135 abuts against the stopper bolt 133 and is urged upwardly thereby, so that the secondary port 132 is put into communication with the oil chamber 128 through a clearance around an outer periphery of the valve 135 and an outer periphery of the leg $135_1$ thereof. If the piston 121 is slightly urged upwardly from this state by the rod 120, the leg $135_1$ of the valve 135 is separated away from the stopper bolt 133, so that the valve body 135 is lowered by a repulsive force of the valve spring 134 to cut off the communication between the second port 132 and the oil chamber 128. Thus, if the piston 121 is further raised, a hydraulic braking pressure is generated in the oil chamber 128 and transmitted through the output port 129 to the left brake cylinder $Bc_{FL}$ of the front wheel Wf and the pressure control valve Cv.

Therefore, a primary port which has conventionally been required can be eliminated because the valve 135 serves to circumvent the primary cup 130 which may otherwise be damaged by passage across a primary port.

Figure 15:
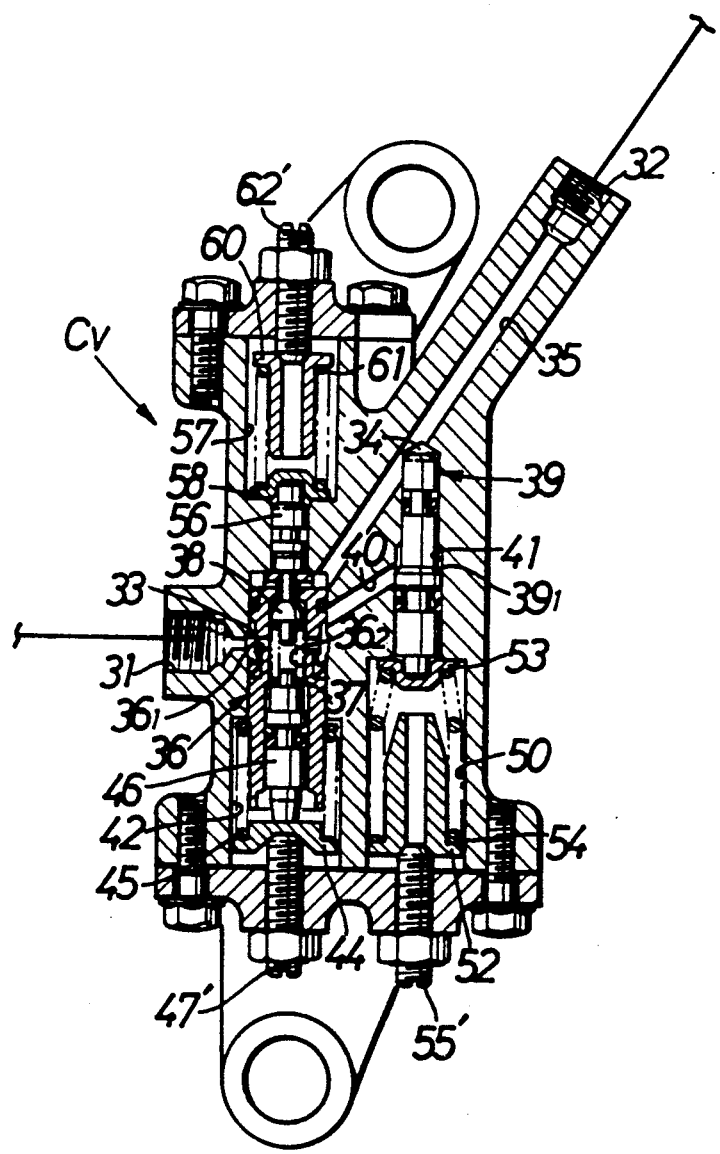

FIG. 15 illustrates the pressure control valve Cv which has a basically same structure as in the previously-described first embodiment. In this second embodiment, however, the pre-load adjuster Pa is not used and therefore, the three load sensing valves 47, 55 and 62 (see FIG. 5) mounted in the pressure control valve Cv to vary the braking characteristic during ride by two persons are replaced by adjusting screws 47', 55' and 62'. Therefore, the other structure is substantially the same as that shown in FIG. 5 and hence, corresponding members or components are identified by the same reference characters and the duplicated description is omitted.

Figure 16:
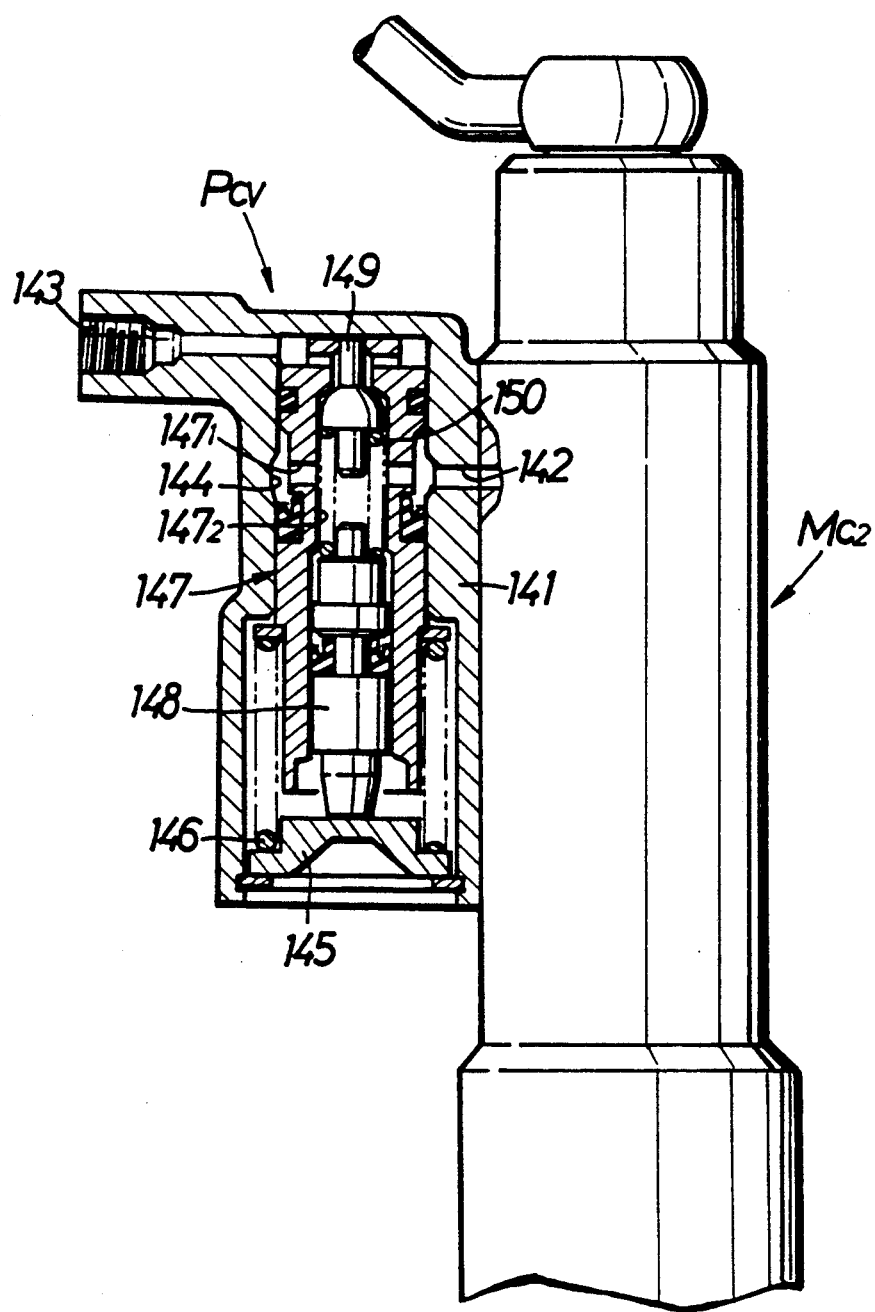

FIG. 16 illustrates a proportioning pressure reduction valve Pcv integrally formed in the second master cylinder $Mc_2$. The proportioning pressure reduction valve Pcv has the same structure as that incorporated in the pressure control valve Cv in the previous first embodiment. More specifically, a casing 141 of the proportioning pressure reduction valve Pcv is provided with an input port 142 to which a hydraulic braking pressure from the second master cylinder $Mc_2$ is supplied, and an output port 143 connected to the central pot $P_2$ in the brake cylinder $Bc_R$ of the rear wheel Wr. Further, a cylindrical proportional valve 147 is vertically movably disposed within a valve chest 144 defined in the casing 141 and biased upwardly by a valve spring 146 which is provided in a compressed manner between the proportional valve 147 and a spring seat 145. An auxiliary valve member 148 having its lower end abutting against the spring seat 145 and a cut valve 149 are disposed in an internal chamber $147_2$ provided in the proportional valve 147 and communicating with the input port 142 through an oil hole $147_1$. The cut valve 149 is biased in a closing direction thereof by a valve spring 150 which is provided in a compressed manner between the cut valve 149 and the auxiliary valve member 148.

Figure 18:
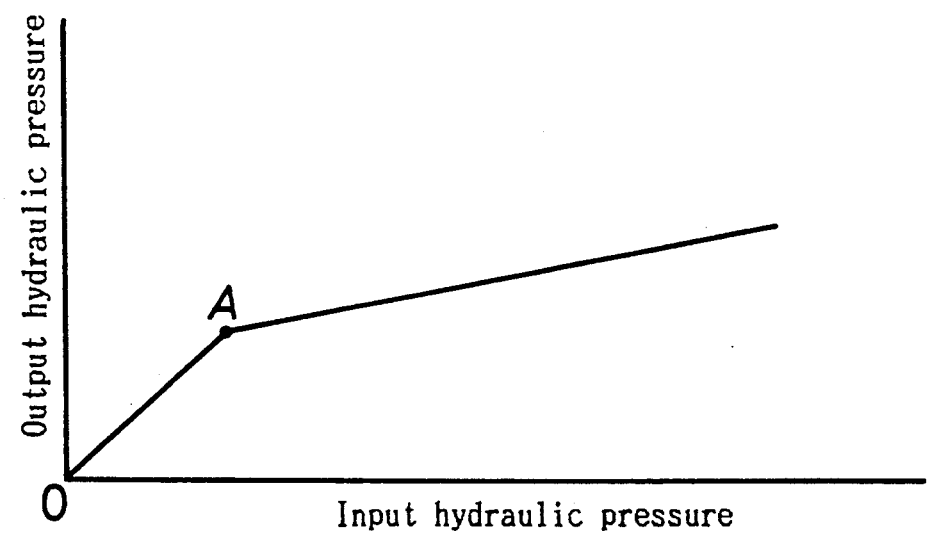

The proportional valve 147 and the cut valve 149 are normally in their opened positions shown in FIG. 16, so that the input port 142 communicates with the output port 143 through the oil hole $147_1$, the internal chamber $147_2$ and an outer periphery of the cut valve 149. If the hydraulic braking pressure transmitted from the second master cylinder $Mc_2$ to the input port 142 is gradually increased, the proportional valve 147 is lowered against a preset load of the valve spring 146 by the hydraulic braking pressure acting on an upper surface of the proportional valve 147, so that the valve 147 is brought into close contact with the cut valve 149 to temporarily cut off the communication between the input port 142 and the output port 143. However, if the hydraulic braking pressure transmitted to the input port 142 is further increased, the pressure in the internal chamber $147_2$ in the proportional valve 147 is increased to urge the proportional valve 147 upwardly, thereby putting the input port 142 and the output port 143 again into communication with each other. In this manner, the proportional valve 147 is vertically vibrated or reciprocates with an increase in hydraulic braking pressure, thereby causing the clearance between the proportional valve 147 and the cut valve 149 to be intermittently opened and closed, so that the rate of increase in the hydraulic braking pressure transmitted to the brake cylinder $Bc_R$ of the rear wheel Wr is reduced. More specifically, with increasing of the input hydraulic pressure, the increase in output hydraulic pressure is reduced at a given ratio from point A, as shown in FIG. 18 in which the horizontal axis represents input hydraulic pressure to the proportioning pressure reduction valve $P_{cv}$, and the vertical axis represents output hydraulic pressure from the valve $P_{cv}$.

Figure 17:
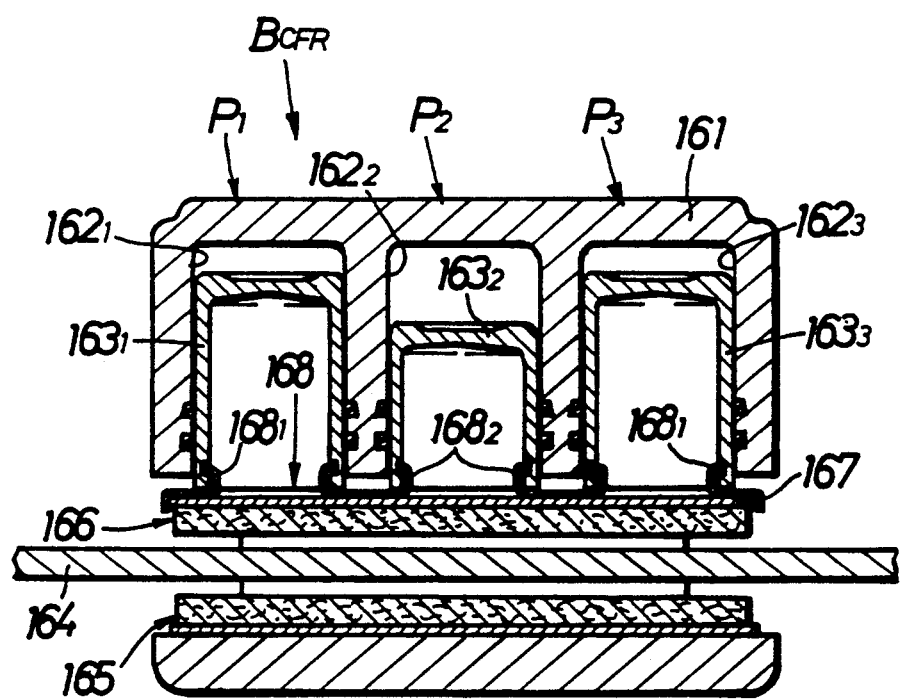

FIG. 17 is a sectional view of the right brake cylinder $Bc_{FR}$ of the front wheel Wf, in which three pistons $163_1$, $163_2$ and $163_3$ are slidably received in cylinders $162_1$, $162_2$ and $162_3$, respectively, which are provided in a casing 161 common to three pots $P_1$, $P_2$ and $P_3$. A movable frictional pad 166 is opposed to a stationary frictional pad 165 with a brake disk 164 interposed therebetween and is supported by a back plate 167. The back plate 167 is coupled to front and rear pistons $163_1$ and $163_3$ by engage pawls $168_1$ formed by cutting and rising a shim 168, and a central piston $163_2$ is coupled to the front and rear pistons $163_1$ and $163_3$ through other engage pawls $168_2$.

As described above, the front and rear pots $P_1$ and $P_3$ are operated by the first master cylinder $Mc_1$ connected to the brake lever L, and the central pot $P_2$ is independently operated by the second master cylinder $Mc_2$ connected to the brake pedal P. However, for example, when the brake lever L is operated alone to drive the pistons $163_1$ and $163_3$ in the front and rear pots $P_1$ and $P_3$, the piston $163_2$ in the central pot $P_2$ is also moved in unison with them without separation away from the movable frictional pad 166. Thus, when the brake pedal P is also operated following the brake lever L and the hydraulic braking pressure from the second master cylinder $Mc_2$ connected to the brake pedal P is transmitted to the piston $163_2$ in the central pot $P_2$, the braking force can be produced without any time lag. Such effect is provided even when the brake lever L is operated following the operation of the brake pedal P, or when the brake lever L and the brake pedal P are concurrently operated. It should be noted that the left brake cylinder $Bc_{FL}$ of the front wheel Wf and the brake cylinder $Bc_R$ of the rear wheel Wr can be also formed into the same structure as the right brake cylinder $Bc_{FR}$ of the front wheel Wf.

Figure 19:
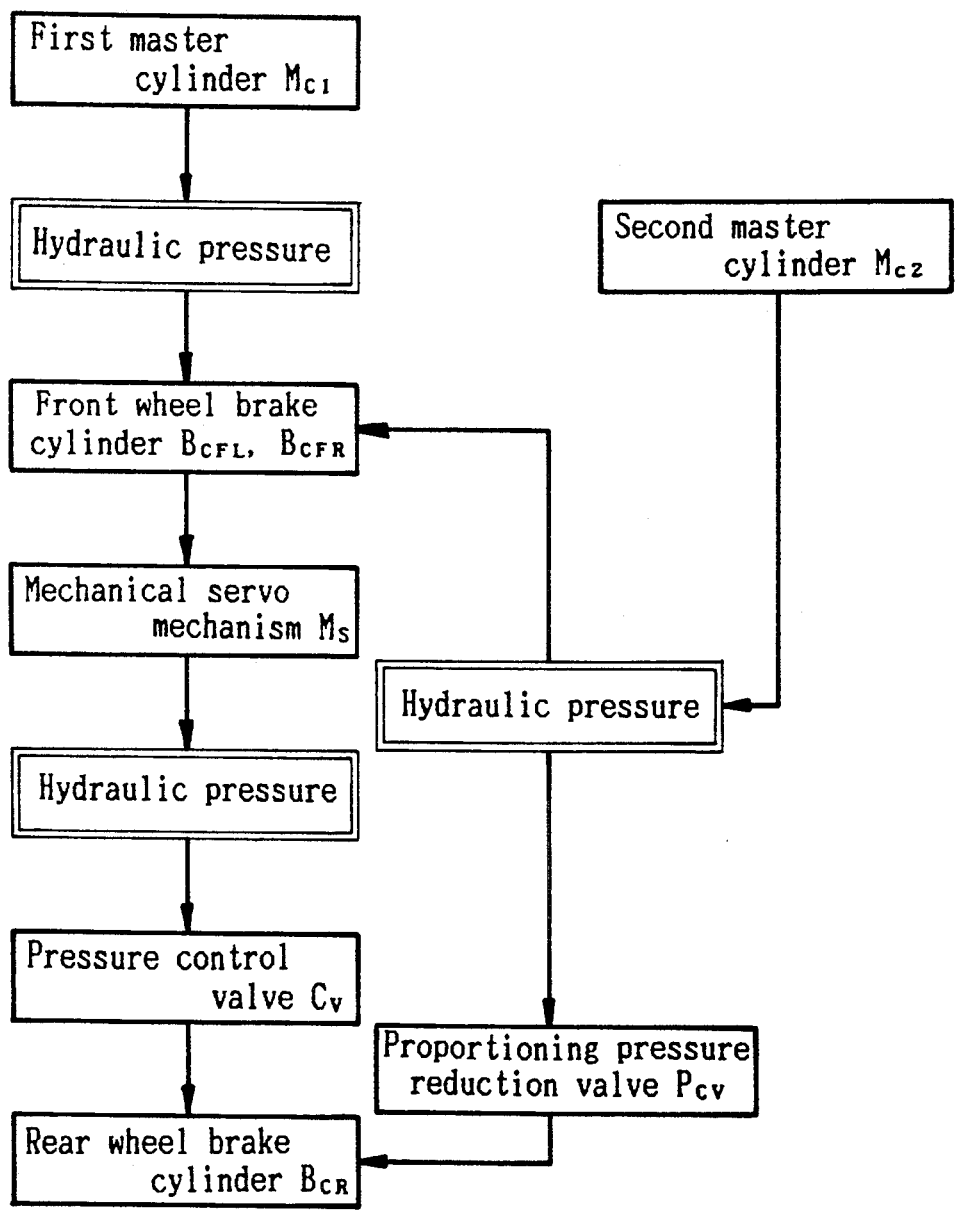

The operation of the second embodiment will be described below with reference to FIGS. 19 and 20.

If the brake lever L is operated alone, the hydraulic braking pressure produced by the first master cylinder $Mc_1$ is transmitted to the front and rear pots $P_1$ and $P_3$ of the left and right brake cylinders $Bc_{FL}$ and $Bc_{FR}$ of the front wheel Wf to brake the front wheel Wf. The secondary hydraulic braking pressure produced by the mechanical servo mechanism Ms due to braking of the front wheel Wf is transmitted to the front and rear pots $P_1$ and $P_3$ of the brake cylinder $Bc_R$ of the rear wheel Wr via the pressure control valve Cv to brake the rear wheel Wr. During this operation, if the secondary hydraulic braking pressure transmitted from the mechanical servo mechanism Ms to the pressure control valve Cv is increased gradually in response to increase in the braking force for the front wheel Wf, the proportional valve 36, the cut valve 38 and the pressure reduction piston 39 provided in the pressure control valve Cv are sequentially operated in the same manner as described above, thereby providing a braking characteristic as shown by a curve line O-A-B-C-D in FIG. 20. The braking characteristic curve provided when the brake lever is operated alone is established so as to extend just below an ideal distribution characteristic curve for ride by one occupant.

On the other hand, if the brake pedal P is operated alone, the hydraulic braking pressure produced by the second master cylinder $Mc_2$ is transmitted to the central pots $P_2$ of the left and right brake cylinders $Bc_{FL}$ and $Bc_{FR}$ of the front wheel Wf to brake the front wheel Wf, and the secondary hydraulic braking pressure produced by the mechanical servo mechanism Ms due to braking of the front wheel Wf is transmitted through the pressure control valve Cv to the front and rear pots $P_1$ and $P_3$ of the brake cylinder $Bc_R$ of the rear wheel Wr to brake the rear wheel Wr simultaneously. When the hydraulic braking pressure produced by the second master cylinder $Mc_2$ is larger than the hydraulic braking pressure produced by the mechanical servo mechanism Ms, the hydraulic braking pressure produced by the second master cylinder $Mc_2$ is transmitted directly to the pressure control valve Cv to brake the rear wheel Wr as in the previously described first embodiment. In any case, with increasing of the hydraulic braking pressure transmitted from the mechanical servo mechanism Ms to the pressure control valve Cv, the proportional valve 36, the cut valve 38 and the pressure reduction piston 39 provided in the pressure control valve Cv are sequentially operated to suppress the increasing of the braking force for the rear wheel Wr.

Now, when the brake pedal P is operated, the hydraulic braking pressure produced by the second master cylinder $Mc_2$ is transmitted also to the central pot $P_2$ of the brake cylinder $Bc_R$ of the rear wheel Wr through the proportioning pressure reduction valve Pcv, and the braking force provided by such central pot $P_2$ is added to the braking force provided by the front and rear pots $P_1$ and $P_3$, so that the braking force for the rear wheel Wr is increased by the added amount. The magnitude of an additional braking force applied to the rear wheel Wr by the operation of the brake pedal P is determined depending upon the magnitude of the hydraulic braking pressure delivered by the proportioning pressure reduction valve Pcv. That is, the hydraulic pressure delivered by the proportioning pressure reduction valve Pcv has a characteristic that the hydraulic braking pressure is gradually increased in accordance with the amount of brake pedal depressed at and after point A as shown in FIG. 18, and hence, as shown by a line O-A'-B'-C'-D' in FIG. 20, the distribution characteristic curve provided when the brake pedal P is operated alone lies above the braking characteristic curve O-A-B-C-D provided when the brake lever L is operated alone, and the difference therebetween is gradually increased, i.e., divergent. The distribution characteristic curve provided when the brake pedal P is operated alone is established so as to lie above an ideal distribution characteristic curve for riding by two occupants. Consequently, when the brake lever L and the brake pedal P are simultaneously operated at a predetermined ratio, the braking characteristic curve can be obtained within a given region $Z_o$ indicted by oblique lines in FIG. 20 in accordance with such ratio, and it is possible to make an actual characteristic curve extremely close to either of ideal distribution characteristic curves for riding by one occupant and two occupants without use of the preload adjuster Pa.

A third embodiment of the present invention will now be described in connection with FIGS. 21 to 23.

Figure 21:
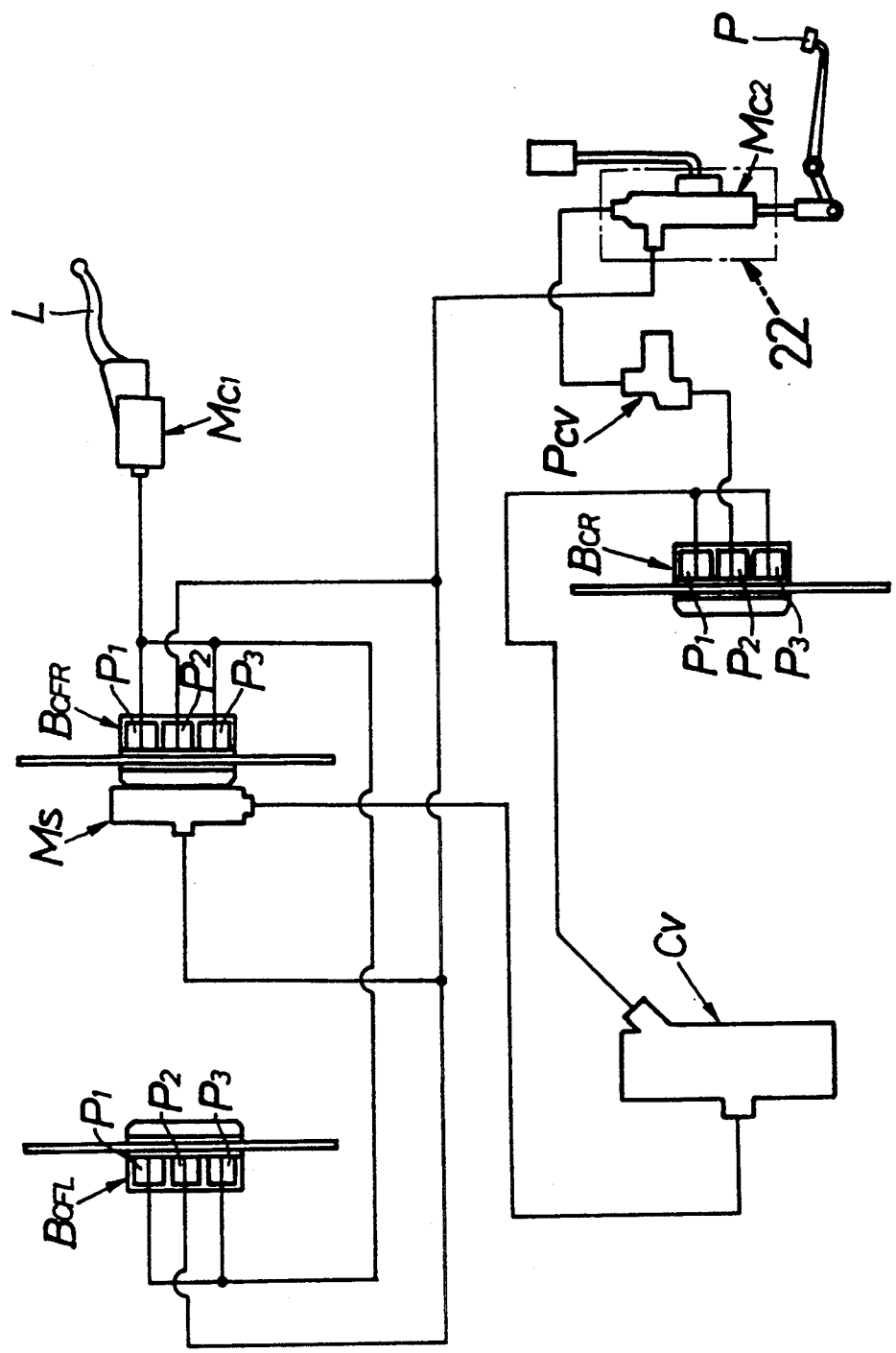

As can be seen from FIG. 21, this embodiment has a feature in the structure of a second master cylinder $Mc_2$ operated by the brake pedal P, and the remaining structures are the same as those in the second embodiment. While the proportioning pressure reduction valve Pcv in the second embodiment has been provided integrally with the second master cylinder $Mc_2$, the proportioning pressure reduction valve Pcv in this third embodiment is provided separately from the second master cylinder $Mc_2$. The internal structure and function of the valve Pcv are identical with those of the valve Pcv in the second embodiment.

Figure 22:
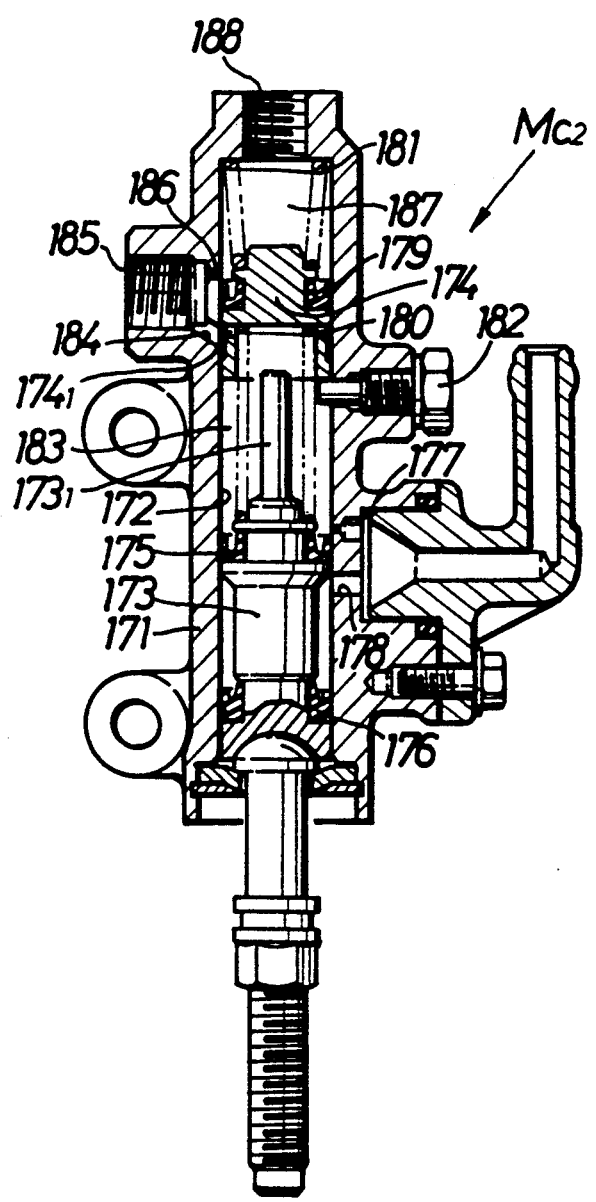

As shown in FIG. 22, the second master cylinder $Mc_2$ comprises a first 173 and a second piston 174 which are slidably received in a cylinder portion 172 formed in a casing 171. The first piston 173 is provided with a primary cup 175 and a secondary cup 176. A primary port 177 and a secondary port 178 are provided at such positions that when the brake pedal P is not operated, they are opened in front and rear of the primary cup 175. A first return spring 180 is provided in a compressed manner between the second piston 174 including only a primary cup 179 and the first piston 173, and a second return spring 181 is compressed between the second piston 174 and the casing 171. The repulsive force of the second return spring 181 is set larger than that of the first return spring 180, so that the second piston 174 biased downwardly by the second return spring 181 is stopped at an illustrated position in abutment against a stopper bolt 182 in a normal condition. A rod $173_1$ is projectingly provided on an upper end of the first piston 173, and in the normal condition, there is a clearance between the rod $173_1$ and the second piston 174.

A first oil chamber 183 is defined between the first and second pistons 173 and 174 and connected to the brake cylinders $Bc_{FL}$ and $Bc_{FR}$ of the front wheel Wf through an oil hole $174_1$ made in the second piston 174, a secondary port 184 made in the casing 171 and an output port 185. The secondary port 184 communicates with a second oil chamber 187 defined in a front portion of the second piston 174 through a primary port 186. The second oil chamber 187 is connected to the proportioning pressure reduction valve Pcv through the output port 188.

Thus, in a normal operational condition shown in FIG. 22, if the first piston 173 is driven upwardly by operation of the brake pedal P, a hydraulic braking pressure is developed in the first oil chamber 183 at a moment when the primary cup 175 moves beyond the primary port 177. Such hydraulic braking pressure is transmitted via the oil hole 174, made in the second piston 174, the secondary port 184 and the output port 185 to the left and right brake cylinders $Bc_{FL}$ and $Bc_{FR}$ of the front wheel Wf and at the same time, is transmitted through the oil hole $174_1$, the secondary port 184, the primary port 186, the second oil chamber 187 and the output port 188 via the proportioning pressure reduction valves Pcv to the brake cylinder $Bc_R$ of the rear wheel Wr.

Figure 23:
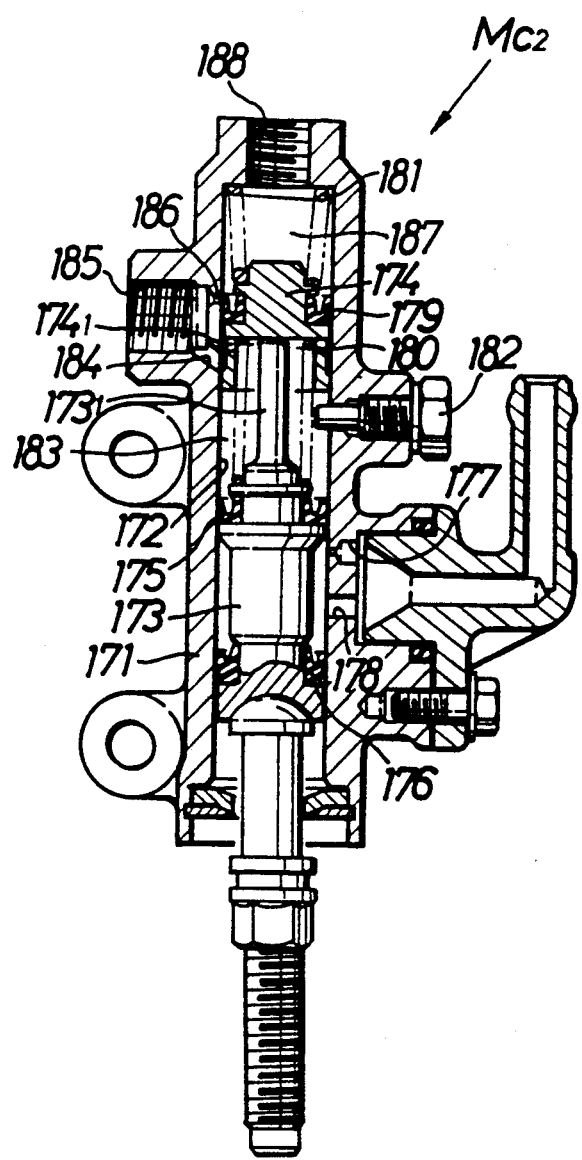

As shown in FIG. 23, even if the hydraulic braking pressure in the first oil chamber 183 is not increased when the brake pedal P is operated, the first piston 173 is further raised, so that the rod $173_1$ abuts against a lower surface of the second piston 174 to urge the second piston 174 upwardly. At a moment when the primary cup 179 of the second piston 174 is moved beyond the primary port 186, a hydraulic braking pressure is developed in the second oil chamber 187 and transmitted through the output port 188 to the brake cylinder $Bc_R$ to brake the rear wheel Wr.

The other operation of the third embodiment is identical with that in the previous second embodiment.

Figure 24:
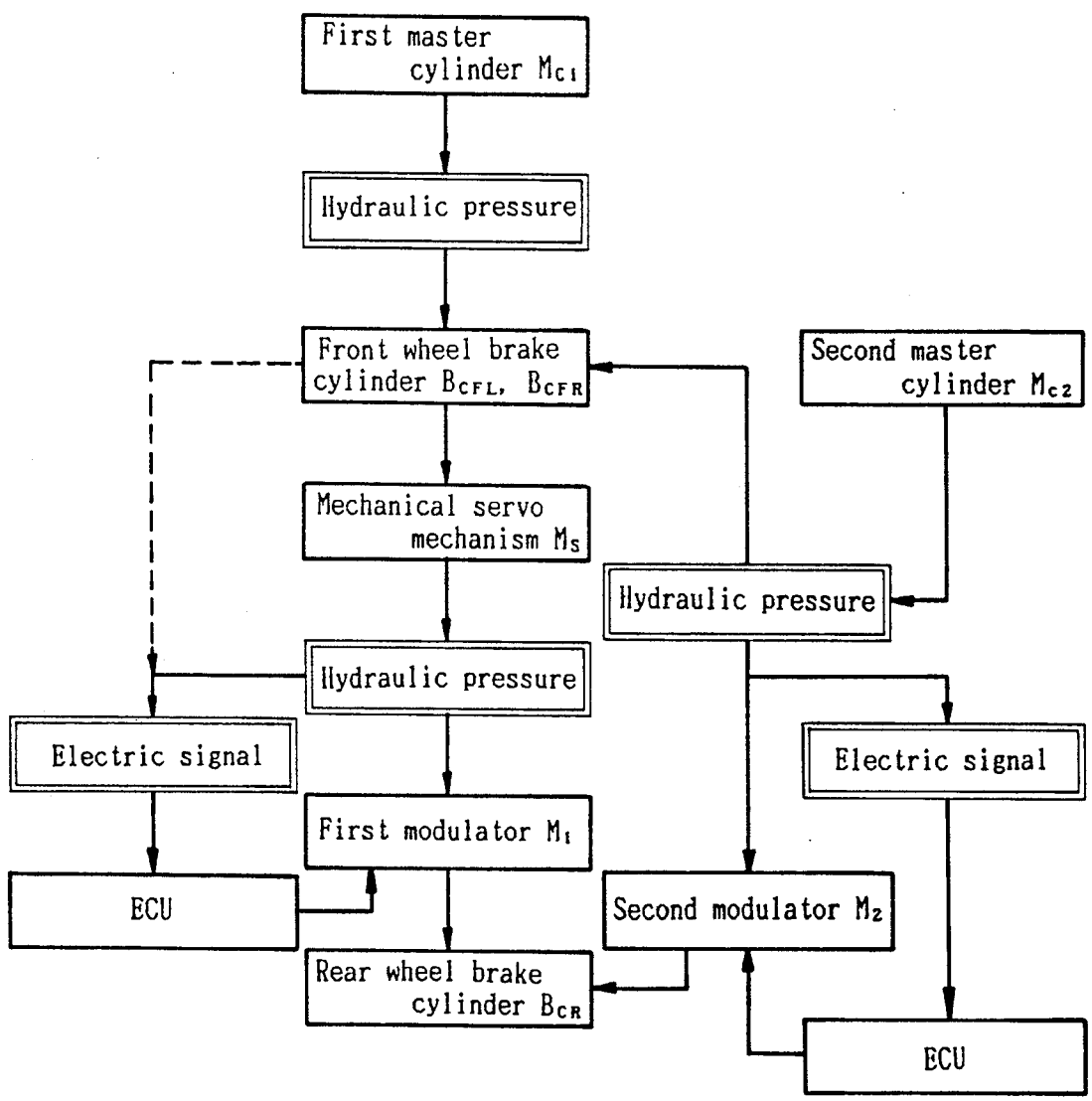
FIG. 24 is a block diagram illustrating a modification of the second and third embodiments.

FIG. 24 is a block diagram illustrating a modification of the second and third embodiments. In this modification, if the left and right brake cylinders $Bc_{FL}$ and $Bc_{FR}$ of the front wheel Wf are operated by a hydraulic braking pressure produced by the first master cylinder $Mc_1$ as a result of operation of the brake lever L, the mechanical servo mechanism Ms produces a secondary hydraulic braking pressure in accordance with the braking force applied to the front wheel Wf. The hydraulic braking pressure produced by the mechanical servo mechanism Ms is fed into a first modulator $M_1$ which corresponds to the pressure control valve Cv in the second and third embodiments. The hydraulic braking pressure produced by the mechanical servo mechanism Ms or the braking force from the brake cylinders $Bc_{FL}$ and $Bc_{FR}$ of the front wheel Wf is converted into an electric signal and input to an ECU, whereby the hydraulic braking pressure to be transmitted to the brake cylinder $Bc_R$ of the rear wheel Wr is modulated by controlling the first modulator $M_1$ with an output signal from the ECU.

On the other hand, the hydraulic braking pressure produced by the second master cylinder $Mc_2$ as a result of operation of the brake pedal P is transmitted to the left and right brake cylinders $Bc_{FL}$ and $Bc_{FR}$ of the front wheel Wf and also through a second modulator $M_2$, which corresponds to the proportioning pressure reduction valve Pcv in the second and third embodiments, to the brake cylinder $Bc_R$ of the rear wheel Wr. At this time, the hydraulic braking pressure produced by the second master cylinder $Mc_2$ is converted into an electric signal and input to the ECU, whereby the pressure-reducing characteristic of the second modulator $M_2$ is controlled by an output signal from the ECU.

Figure 20:
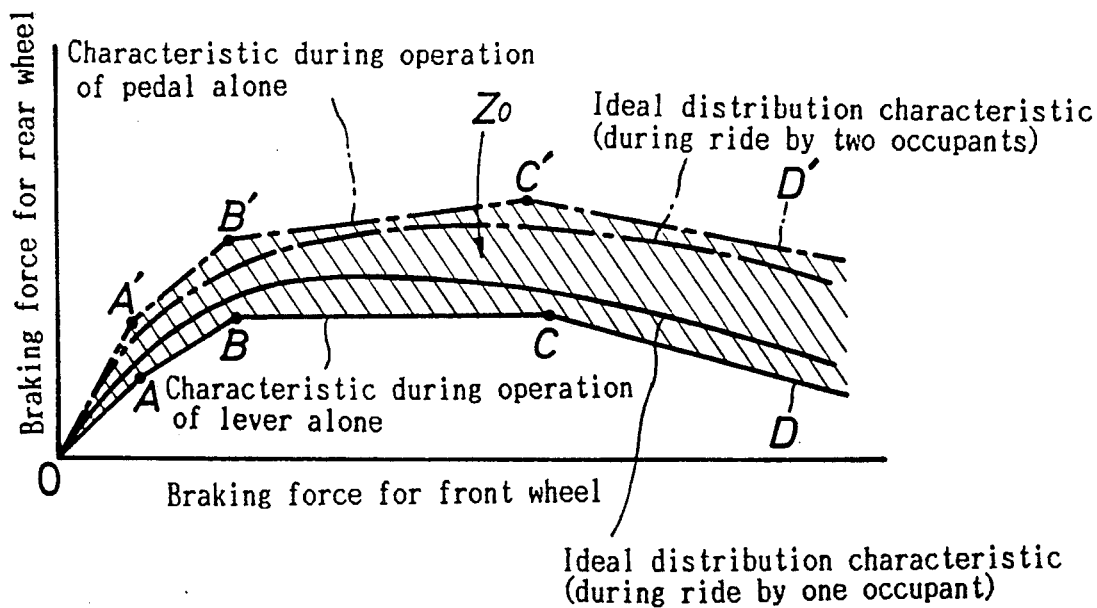

Thus, a braking-force distribution characteristic as shown in FIG. 20 can be obtained even in this modification and moreover, the use of the electric signal ensures not only that hydraulic piping can be omitted but also that air removal is made unnecessary, leading to an improved maintenance performance. Where this modification is applied to a vehicle equipped with an anti-lock brake system, a modulator can be commonly used for the first and second modulators $M_1$ and $M_2$, which contributes to a reduction in cost.

Figure 25:
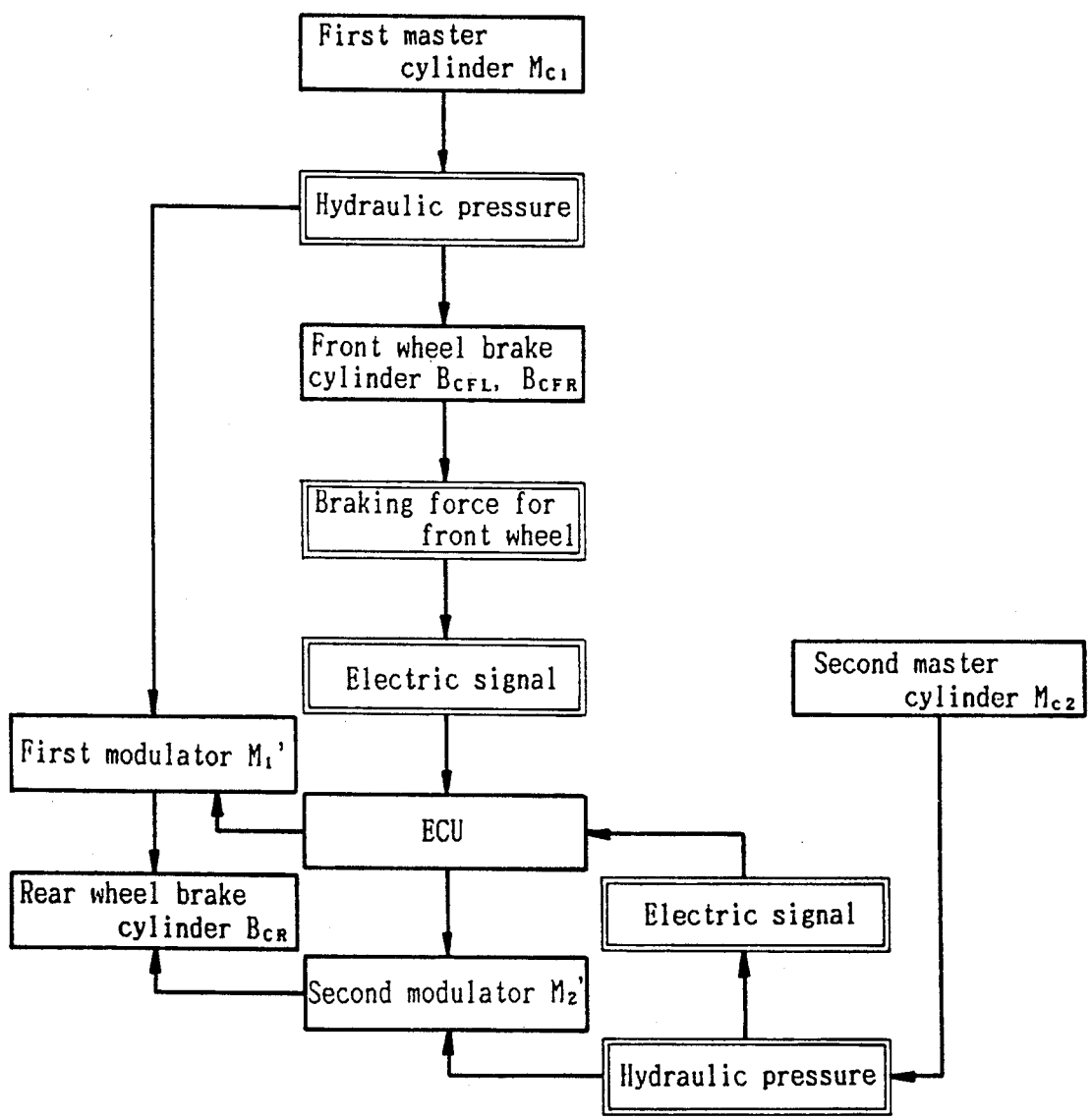
FIG. 25 is a block diagram illustrating another modification of the second and third embodiments.

FIG. 25 is a block diagram illustrating another modification of the second and third embodiments. In this modification, if the left and right brake cylinders $Bc_{FL}$ and $Bc_{FR}$ of the front wheel Wf are operated by the hydraulic braking pressure produced by the first master cylinder $Mc_1$ as a result of operation of the brake lever L, the braking force for the front wheel Wf is converted into an electric signal and input to the ECU. The hydraulic braking pressure produced by the first master cylinder $Mc_1$ is fed into a first modulator $M_1'$ which corresponds to the pressure control valve Cv in the second and third embodiments and is modulated therein on the basis of an output signal from the ECU and then transmitted to the brake cylinder $Bc_R$ of the rear wheel Wr.

On the other hand, the hydraulic braking pressure produced by the second master cylinder $Mc_2$ as a result of operation of the brake pedal P is transmitted to the brake cylinder $Bc_R$ of the rear wheel Wr through a second modulator $M_2'$ which corresponds to the proportioning pressure reduction valve Pcv in the second and third embodiments. At this time, the hydraulic braking pressure produced by the second master cylinder $Mc_2$ is converted into an electric signal and input to the ECU, whereby the pressure-reducing characteristic of the second modulator $M_2'$ is controlled by an output signal from the ECU.

Thus, even in this modification, it is possible to provide the same effect as in the previously-described modification shown in FIG. 24.

Figure 26:
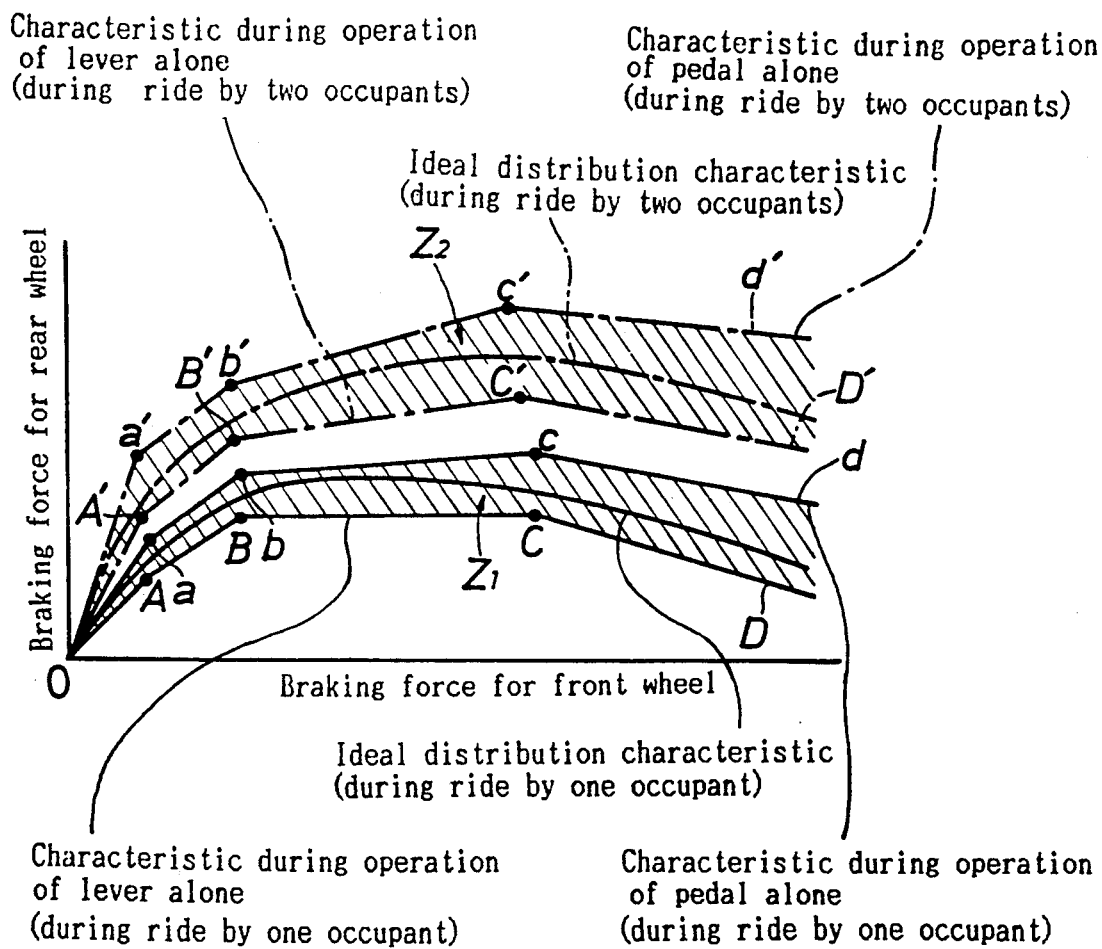
FIG. 26 is a graph illustrating a braking characteristic of a fourth embodiment of the present invention.

FIG. 26 is a graph illustrating a braking characteristic in a fourth embodiment of the present invention. This fourth embodiment corresponds to the braking system of the second embodiment shown in FIG. 11 but with its pressure control valve Cv being replaced by one Cv of the first embodiment connected to the pre-load adjuster Pa. During a ride by one occupant, a braking-force distribution characteristic curve A-B-C-D provided when the brake lever L is operated alone and a braking-force distribution characteristic curve a-b-c-d provided when the brake pedal P is operated alone are located below and above an ideal distribution characteristic curve, respectively. During a ride by two occupants wherein the pre-load adjuster Pa is operated, a braking-force distribution characteristic curve A'-B'-C'-D' provided when the brake lever L is operated alone and a braking-force distribution characteristic curve a'-b'-c'-d' provided when the brake pedal P is operated alone are located below and above an ideal distribution characteristic curve, respectively.

Consequently, where the brake pedal L and the brake pedal P are operated at a predetermined ratio, it is ensured that during a ride by one occupant, it is possible to locate and actual braking characteristic curve in a region $Z_1$ surrounded by the curves A-B-C-D and a-b-c-d which are extremely close to the ideal distribution characteristic curve during a ride by one occupant, while during a ride by two occupants, it is possible to locate an actual braking characteristic curve in a region $Z_2$ surrounded by the curves A'-B'-C'-D' and a'-b'-c'-d' which are extremely close to the ideal distribution characteristic curve during a ride by two occupants.

Although the embodiments of the present invention have been described above, it will be understood that the present invention is not limited thereto, and various minor modifications in design can be made without departing from the scope of the present invention defined in claims.

We claim:

1. A brake system for a motorcycle having a front fork, a front wheel mounted to the front fork and a rear wheel, comprising
   a hand-operated element;
   a first input means operated by said hand-operated element to generate a first brake force;
   a foot-operated element;
   a second input means operated by said foot-operated element to generate a second brake force;
   a primary means for braking mounted at one of the front wheel and the rear wheel, said primary means being operable by said first brake force of said first input means and by said second brake force of said second input means;
   a secondary means for braking mounted at the other of the front wheel and the rear wheel, said secondary means being operable in response to the operation of said primary means for braking, the distribution of said first and said second brake forces to said front and rear wheels being in a first ratio responsive to the sole operation of the hand-operated element and in a second ratio different from said first ratio responsive to the sole operation of the foot-operated element.

2. The brake system of claim 1 further comprising a high select means for selecting the larger of said first and second brake forces to said primary means for braking and distributing said selected larger of said first and second brake forces to said secondary means for braking.

3. The brake system of claim 1 wherein said primary means for braking is mounted at the front wheel, said brake system further comprising means disposed on the front fork for operating said secondary means for braking in response to said primary means for braking.

4. The brake system of claim 1 wherein said secondary means for braking includes a braking-force control means for controlling the distribution of said first and second brake forces to the front and rear wheels.

5. The brake system of claim 4 wherein said braking-force control means boosts braking force to the rear wheel by a boost force at least equal to a preselected amount responsive to said second brake force.

6. The brake system of claim 5 wherein said braking-force control means includes a proportional valve, a cut valve and a pressure reduction piston to generate a force distribution to the front and rear wheels in at least three stage steps.

7. The brake system of claim 1 wherein one of said primary and secondary means for braking includes a pair of brakes disposed at one of the front and rear wheels, both said brakes of said pair of brakes being actuated by one of said first and second input means, only one said brake of said pair of brakes being actuated by the other of said first and second input means.

8. The brake system of claim 7 wherein said pair of brakes are mounted at the front wheel and both brakes of said pair of brakes are actuated by said first input means.

9. The brake system of claim 1 wherein said primary means for braking includes a pair of brakes disposed on left and right sides of one of the front wheel and the rear wheel, said secondary means for braking includes at least one brake disposed on the other of the front wheel and the rear wheel, said brakes of said primary means braking and said at least one brake of said secondary means for braking each have a plurality of means for applying braking force through said brakes to the wheels, one of said first input means and said second input means actuating at least one and less than all of said plurality of means for applying braking force in each said brake of said primary means for braking and in said at least one brake of said secondary means for braking and the other of said first input means and said second input means actuating the remainder of said plurality of means for applying braking force in each said brake of said primary means for braking and actuating all of said plurality of means for applying braking force in said secondary means for braking.

10. The brake system of claim 1 wherein said secondary means for braking is operable in response to both of said brake force and the operation of one of said first and second input means.

11. A brake system for a motorcycle having front and rear wheels, comprising
    a hand-operated element;

a first input means operated by said hand-operated element;

a foot-operated element;

a second input means operated by said foot-operated element;

means for braking mounted to the front wheel and the rear wheel, said means being operable by said first input means to generate a first force distribution to the front wheel and the rear wheel and by said second input means to generate a second force distribution to the front wheel and the rear wheel;

a braking-force control means for controlling the force distribution of braking force to the front and rear wheels in accordance with respective operating forces of the first and second input means, said braking-force control means generating a third force distribution to the front wheel and the rear wheel, said third force distribution being intermediate said first force distribution and said second force distribution when both said first input means and said second input means are applied.

12. The brake system of claim 11 wherein said secondary means is operable in response to the operation of said primary means for braking.

13. The brake system of claim 11 wherein said first force distribution is selected for application of low braking force and said second force distribution is selected for application of high braking force.

14. The brake system of claim 13 wherein said means for braking include a pair of brakes disposed at one of the front and rear wheels, both said brakes of said pair of brakes being actuated by one of said first and second input means and only one said brake of said pair of brakes being actuated by the other of said first and second input means.

15. The brake system of claim 14 wherein said pair of brakes are mounted at the front wheel and both brakes of said pair of brakes are actuated by said first input means.

16. The brake system of claim 13 wherein said means for braking include a pair of brakes disposed on left and right sides of one of the front wheel and the rear wheel and at least one brake disposed on the other of the front wheel and the rear wheel, said brakes of said pair of brakes and said at least one brake each have a plurality of means for applying braking force through said brakes to the wheels, one of said first input means and said second input means actuating at least one and less than all of said plurality of means for applying braking force in each said brake of said pair of brakes and in said at least one brake and the other of said first input means and said second input means actuating the remainder of said plurality of means for applying braking force in each said brake of said pair of brakes and actuating all of said plurality of means for applying braking force in said at least one brake.

17. The brake system of claim 11 wherein said braking-force control means includes a proportional valve, a cut valve and a pressure reduction piston to generate said third force distribution in at least three stage steps.

* * * * *